United States Patent
Arimitsu et al.

(10) Patent No.: US 11,469,688 B2
(45) Date of Patent: Oct. 11, 2022

(54) VIBRATION ACTUATOR, AND DRIVE DEVICE, MULTI-AXIS STAGE UNIT, AND ARTICULATED ROBOT THAT USE VIBRATION ACTUATOR

(71) Applicant: CANON KABUSHIKI KAISHA, Tokyo (JP)

(72) Inventors: Yasumichi Arimitsu, Yokohama (JP); Kosuke Fujimoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 181 days.

(21) Appl. No.: 16/904,694

(22) Filed: Jun. 18, 2020

(65) Prior Publication Data
US 2020/0403532 A1    Dec. 24, 2020

(30) Foreign Application Priority Data

Jun. 19, 2019 (JP) .............................. JP2019-113755

(51) Int. Cl.
*H02N 2/00* (2006.01)
*B06B 1/04* (2006.01)
*B06B 1/06* (2006.01)

(52) U.S. Cl.
CPC .............. *H02N 2/001* (2013.01); *B06B 1/045* (2013.01); *B06B 1/0644* (2013.01); *H02N 2/005* (2013.01)

(58) Field of Classification Search
CPC ...... H02N 2/001; H02N 2/005; H02N 2/0015; H02N 2/0065; H02N 2/046; H02N 2/026; B06B 1/045; B06B 1/0644; B06B 1/0622; B25J 9/10
See application file for complete search history.

(56) References Cited

U.S. PATENT DOCUMENTS

| 2017/0082828 A1* | 3/2017 | Sumioka ................. G02B 7/04 |
| 2018/0175747 A1* | 6/2018 | Tomura ................ H02N 2/0055 |
| 2018/0242820 A1 | 8/2018 | Tanaka |
| 2019/0374090 A1* | 12/2019 | Tanaka ................. A61B 1/0057 |

FOREIGN PATENT DOCUMENTS

| JP | 63-316675 A | 12/1988 |
| JP | 2018-140101 A | 9/2018 |

OTHER PUBLICATIONS

U.S. Appl. No. 16/884,172, Yasumichi Arimitsu Kosuke Fujimoto, filed May 27, 2020.

* cited by examiner

*Primary Examiner* — Emily P Pham
(74) *Attorney, Agent, or Firm* — Venable LLP

(57) ABSTRACT

A vibration actuator capable of reducing variations of pressure force and reaction force acting on a vibrator and a contact member has a specific construction. Vibrator devices respectively have vibrators, each of which includes an elastic member and an electro-mechanical energy conversion element. A contact member contacts the vibrators and is movable in a predetermined direction relatively to the vibrators. A restraint member fixes a first vibrator device among the vibrator devices to restrict a degree of freedom in the predetermined direction. A flexible member connects a second vibrator device among the vibrator devices to the first vibrator device. The flexible member has predetermined rigidity in the predetermined direction and has rigidity, which is lower than the predetermined rigidity, in directions other than the predetermined direction.

20 Claims, 22 Drawing Sheets

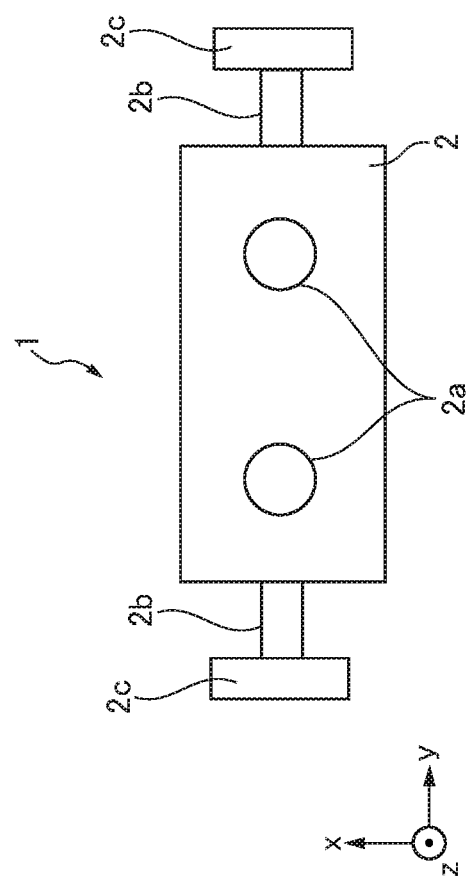
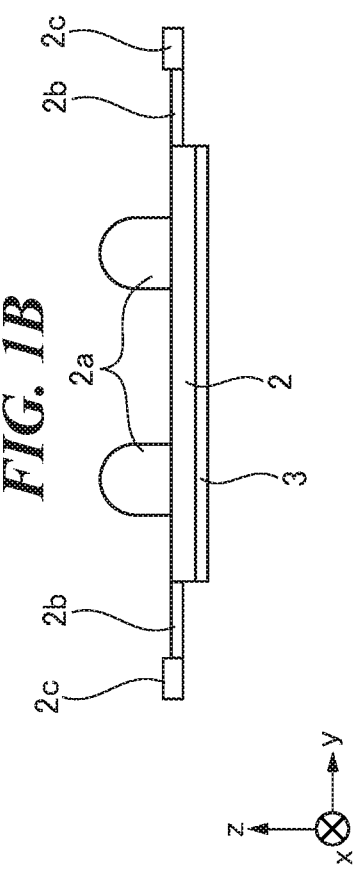
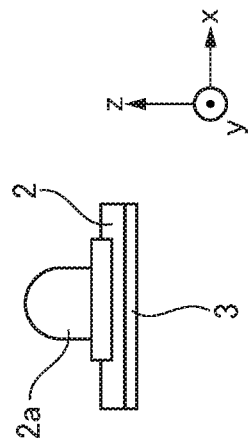

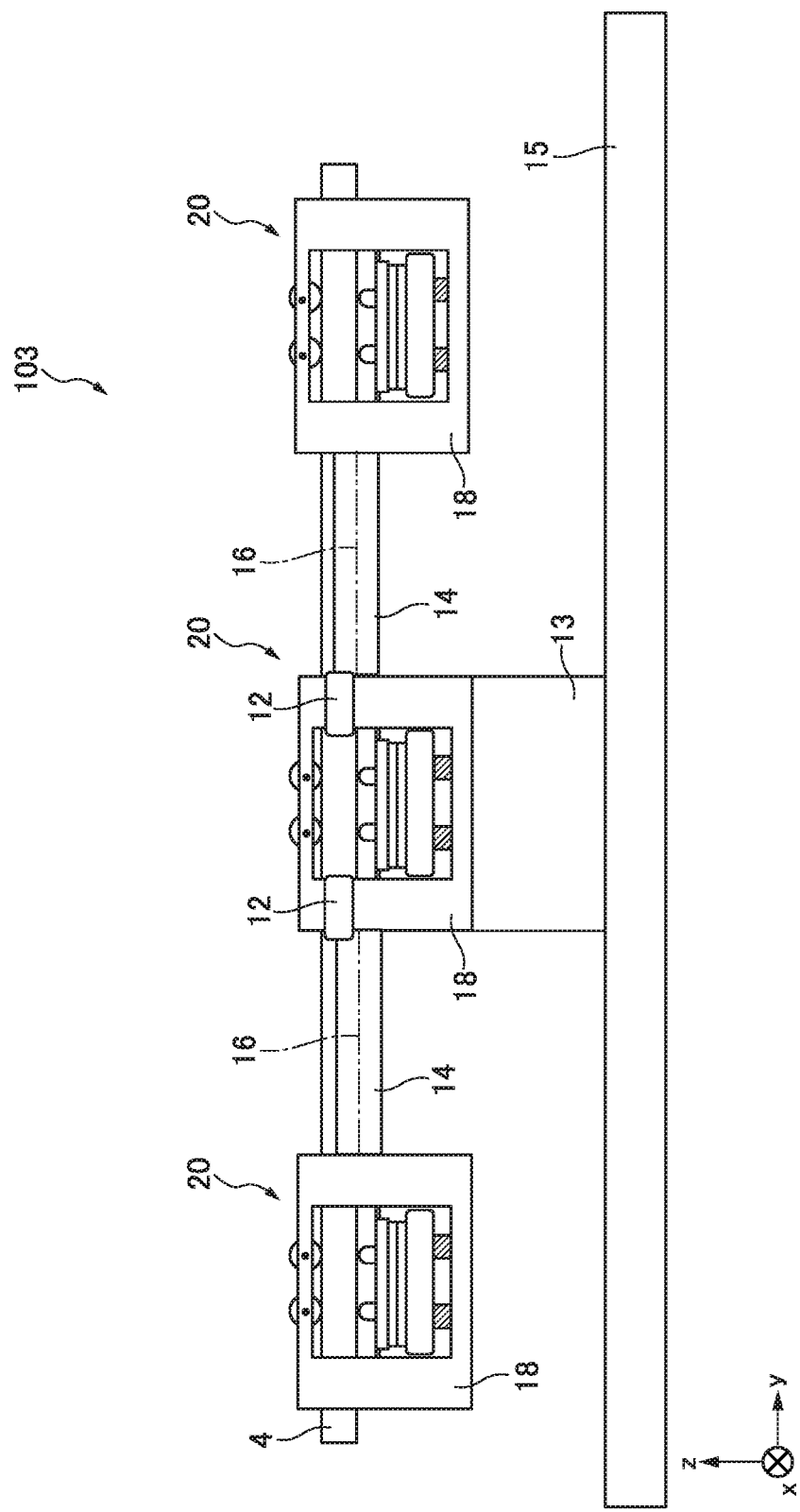

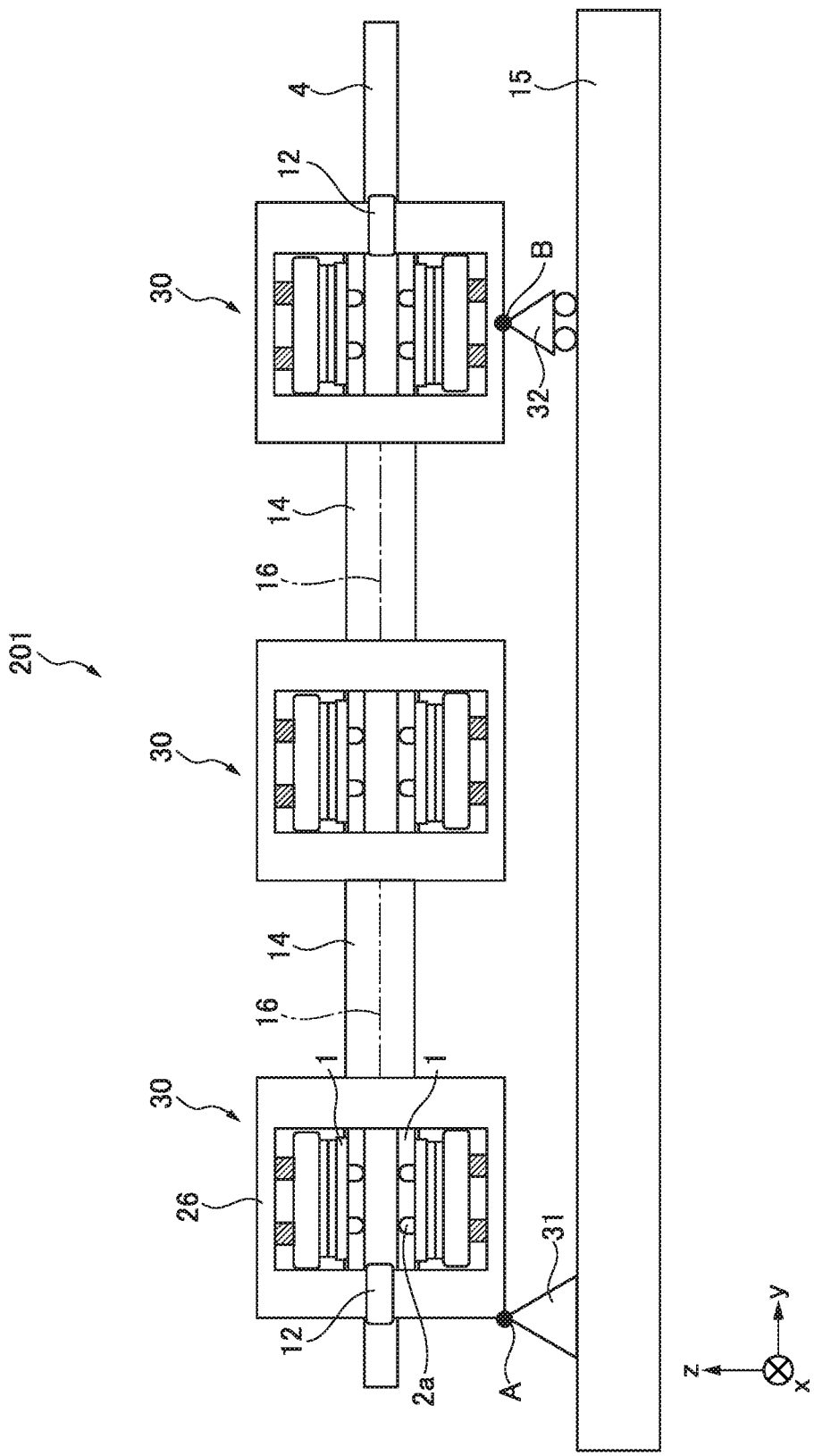

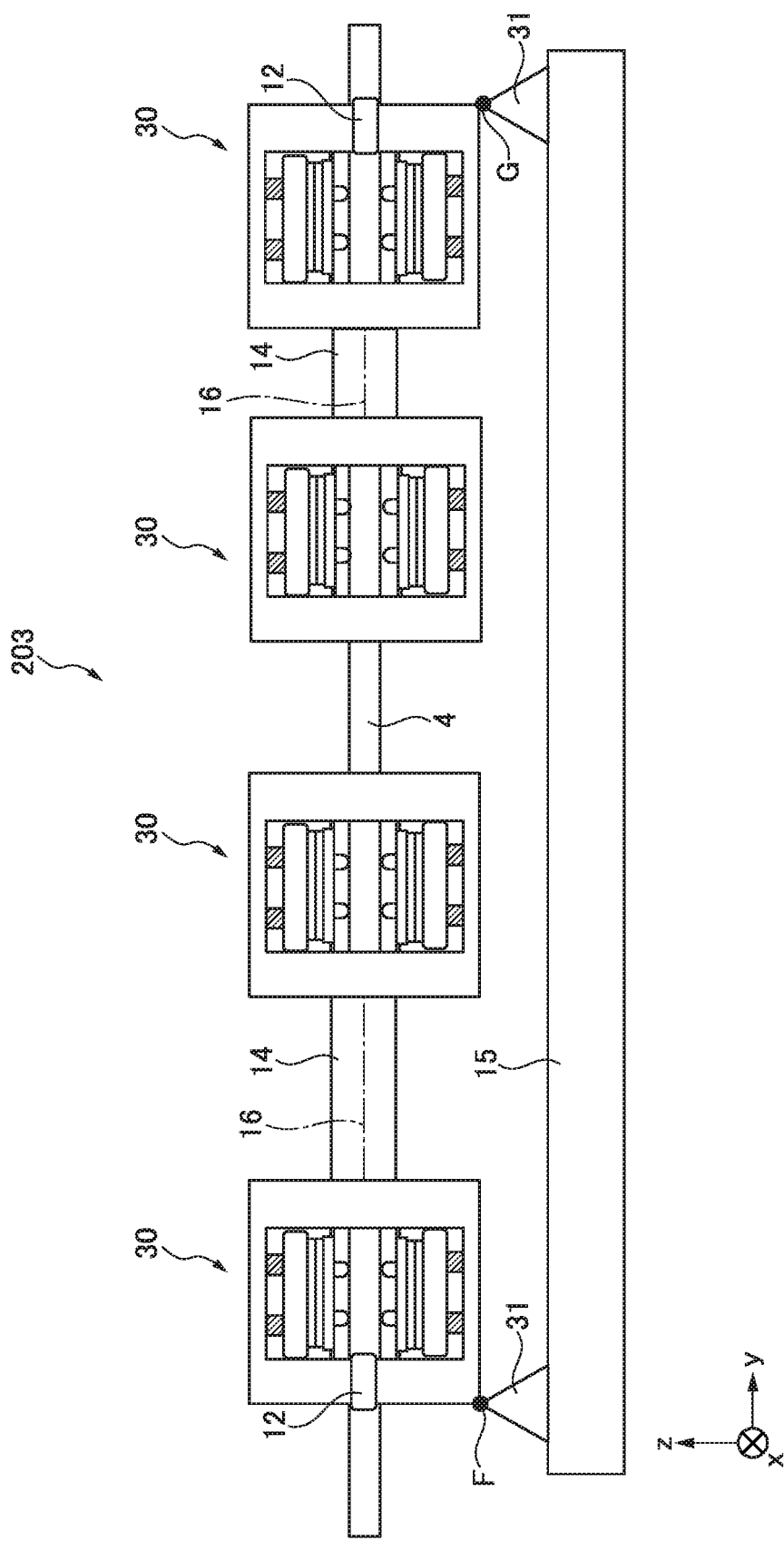

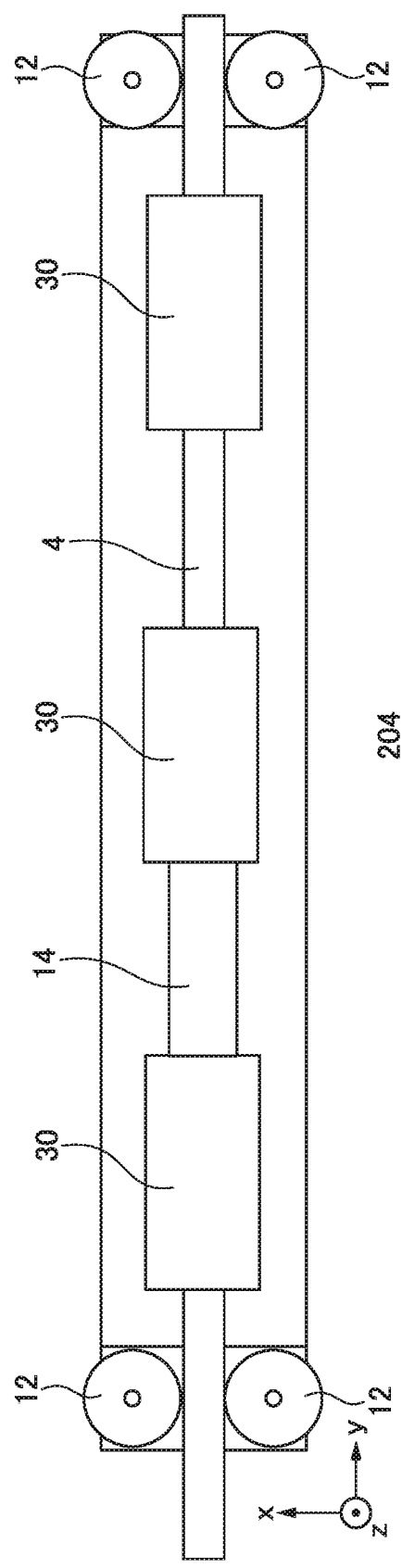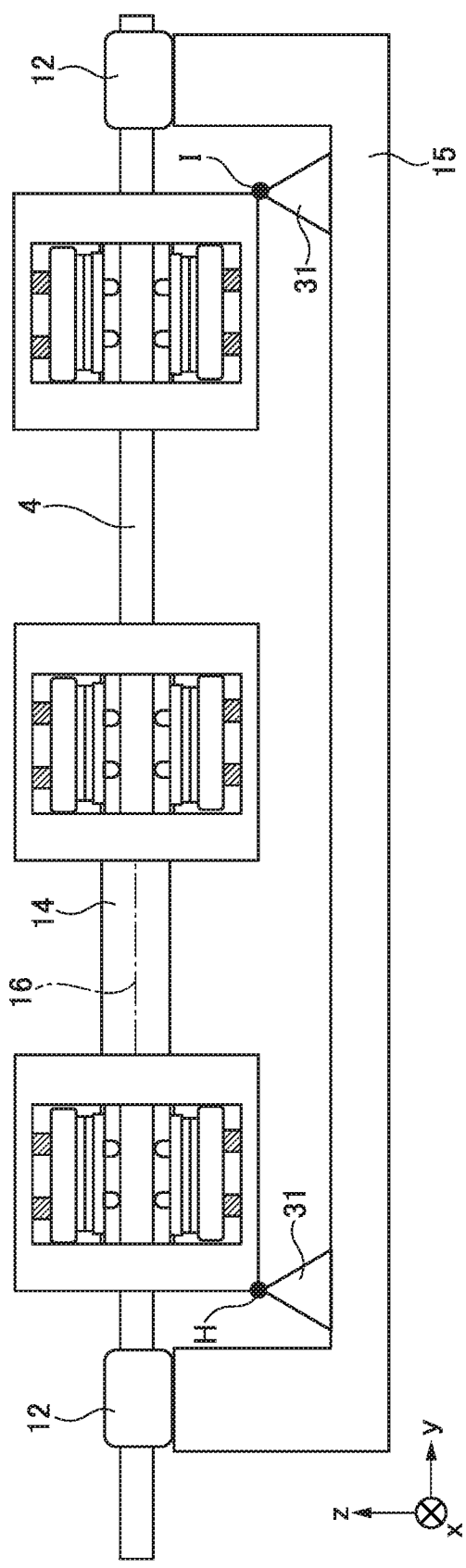

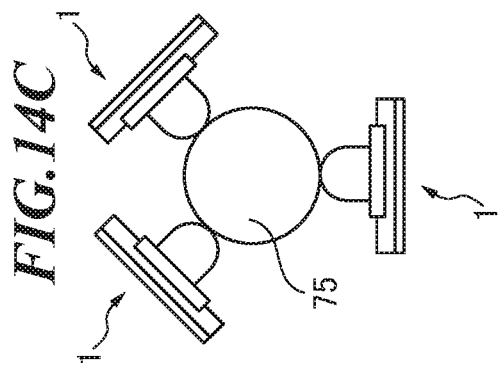
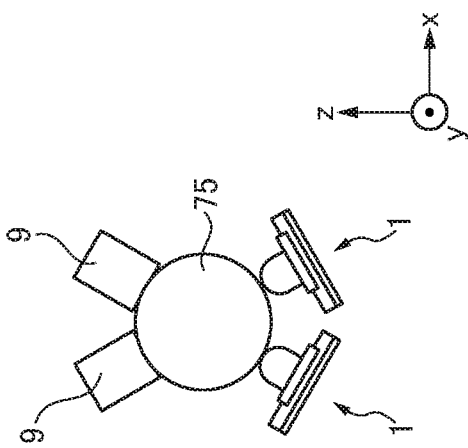
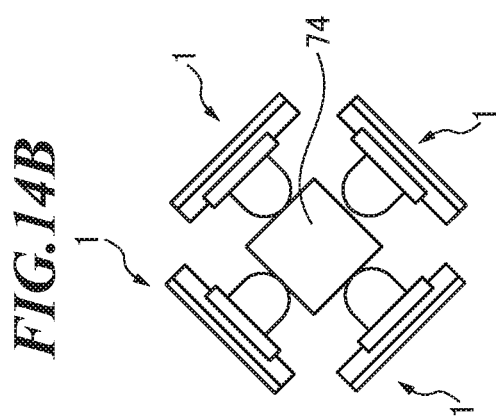
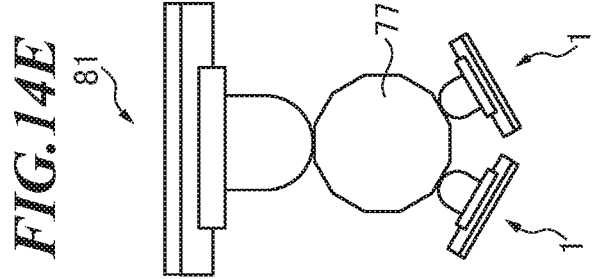
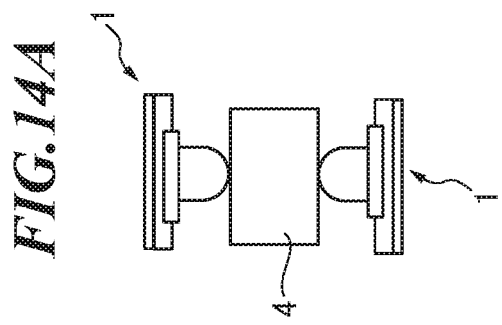
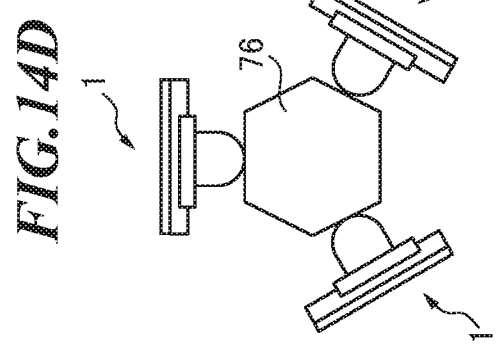

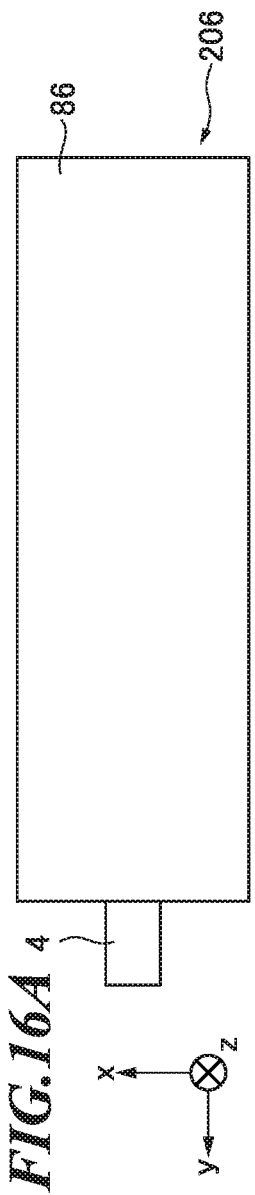
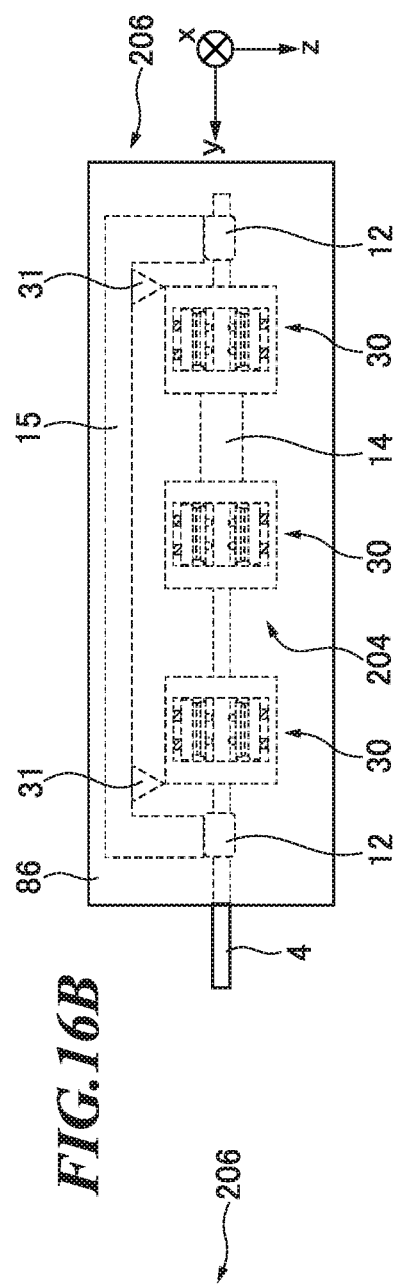
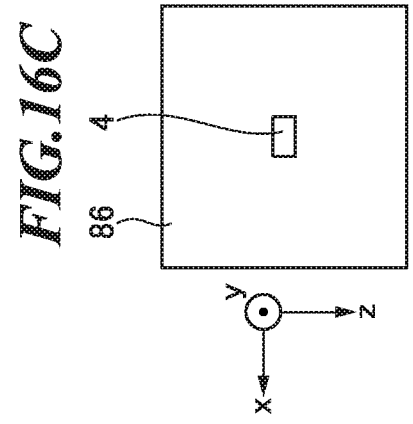
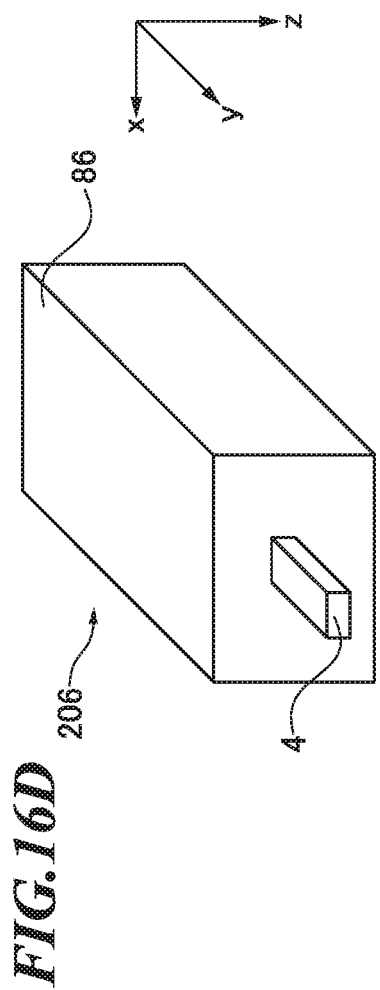

VIBRATION ACTUATOR, AND DRIVE DEVICE, MULTI-AXIS STAGE UNIT, AND ARTICULATED ROBOT THAT USE VIBRATION ACTUATOR

BACKGROUND OF THE INVENTION

Field of the Invention

The present invention relates to a vibration actuator in which a vibrator and contact member move relatively, and also relates to a drive device, a multi-axis stage unit, and an articulated robot that use the vibration actuator.

Description of the Related Art

There are proposed vibration actuators, such as a vibration actuator that obtains thrust between a vibrator and a contact member by generating vibration that combines different vibration modes in the vibrator, and a vibration actuator that changes frictional force between a vibrator and a contact member by exciting vibration in a single vibration mode.

In such vibration actuators, in order to increase thrust or torque, to improve a degree of freedom of design, and to disperse a failure risk, etc., providing a plurality of vibrators is proposed. For example, Japanese Laid-Open Patent Publication (Kokai) No. 63-316675 (JP 63-316675A) discloses a piezo-electric linear motor that arranges a plurality of piezoelectric vibrators in series to move a common moving member (a contact member in this specification) in a predetermined direction.

The configuration that a vibration actuator has a plurality of vibrators as the technique disclosed in the above-mentioned publication increases a size of a contact member in a longitudinal direction (moving direction) with matching to a shape of the vibration actuator. As a result, it becomes hard to form and keep the shape of the contact member in the moving direction with sufficient accuracy, and the contact member tends to deform easily.

Deformation of the contact member varies the pressure forces that press the vibrators against the contact member among the vibrators. Reaction forces that occur to the pressure forces also vary. In a case where pressure force and reaction force of a vibrator are relatively small, since frictional force between a vibrator and a contact member lowers relatively, thrust and torque may lower. In the meantime, in a case where pressure force and reaction force of a vibrator are relatively large, frictional force between a vibrator and a contact member may rise relatively so as to exceed a design permissible range. As a result, abnormal wear may occur or components of a vibrator device may deform or break.

SUMMARY OF THE INVENTION

The present invention provides a vibration actuator that is capable of reducing variations of pressure force and reaction force acting on a vibrator and a contact member. Moreover, the present invention provides a drive device, a multi-axis stage unit, and an articulated robot that use the vibration actuator.

Accordingly, a first aspect of the present invention provides a vibration actuator including vibrator devices that respectively have vibrators each of which includes an elastic member and an electro-mechanical energy conversion element, a contact member that contacts the vibrators and is movable in a predetermined direction relatively to the vibrators; a restraint member that fixes a first vibrator device that is at least one of the vibrator devices to restrict a degree of freedom in the predetermined direction, and a flexible member that has predetermined rigidity in the predetermined direction, has rigidity, which is lower than the predetermined rigidity, in directions other than the predetermined direction, and connects a second vibrator device that is at least one of the vibrator devices to the first vibrator device.

Accordingly, a second aspect of the present invention provides a drive device including one or more vibration actuators of the first aspect, and a main body to which the one or more vibration actuators are fixed by the restraint member.

Accordingly, a third aspect of the present invention provides a multi-axis stage unit including a stationary part, a stage that is movable with respect to the stationary part, and at least one vibration actuator of the first aspect that is provided in the stationary part and drives the stage.

Accordingly, a fourth aspect of the present invention provides an articulated robot including joints, movable parts that are connected by the joints, and the vibration actuators of the first aspect that drive the movable parts According to the present invention, the vibration actuator that has a plurality of vibrator devices is able to reduce the variations of the pressure force and reaction force acting on a vibrator and contact member.

Further features of the present invention will become apparent from the following description of exemplary embodiments with reference to the attached drawings.

BRIEF DESCRIPTION OF THE DRAWINGS

FIG. 1A, FIG. 1B, and FIG. 1C are views schematically showing a vibrator concerning a first embodiment of the present invention.

FIG. 6 is a view schematically showing another vibrator device concerning the first embodiment of the present invention.

FIG. 9 is a front view schematically showing a vibration actuator concerning a second embodiment of the present invention.

FIG. 11 is a front view schematically showing another vibration actuator concerning the second embodiment of the present invention.

FIG. 12A and FIG. 12B are views schematically showing another vibration actuator concerning the second embodiment of the present invention.

FIG. 14A through FIG. 14F are explanatory views showing configuration examples of vibrators of various vibrator devices that are able to support the contact member in the second embodiment of the present invention.

FIG. 16A through FIG. 16D are explanatory views showing a configuration example of an actuator unit that is a vibration actuator equipped with an exterior member.

DESCRIPTION OF THE EMBODIMENTS

Figure 2A:
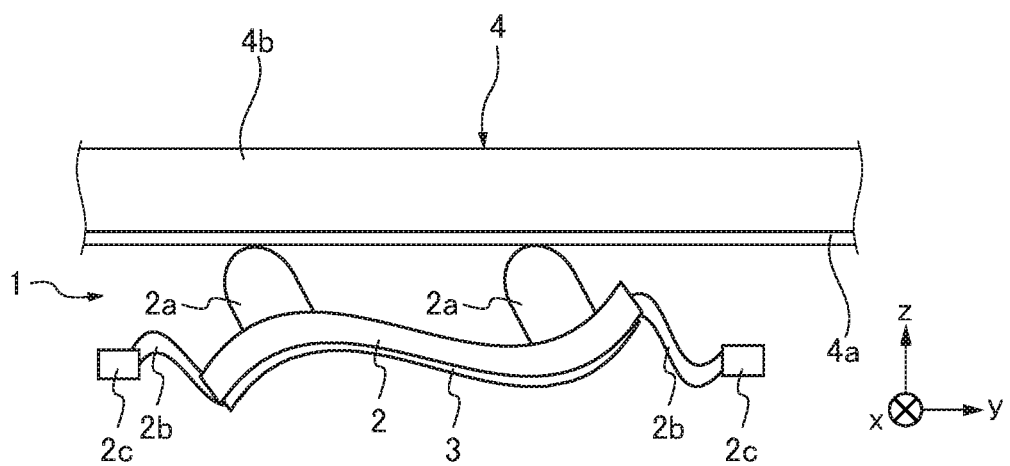
FIG. 2A, FIG. 2B, and FIG. 2C are explanatory views showing two vibration modes excited in the vibrator concerning the first embodiment of the present invention.

Hereafter, embodiments according to the present invention will be described in detail by referring to the drawings. Embodiments described below are examples of configurations that can achieve the present invention. The following embodiments can be corrected or changed suitably according to a configuration of an apparatus to which the present invention is applied and various conditions. Accordingly, the scope of the present invention is not limited by the configuration described in the following embodiments. For example, configurations described in the embodiments can be combined as long as there is no mutual inconsistency. A vibration actuator that has a plurality of vibrator devices concerning each of the following embodiments is applicable to various devices including a multi-axis stage and an articulated robot mentioned later.

A vibration actuator concerning a first embodiment of the present invention will be described by referring to FIG. 1A through FIG. 8D. It should be noted that coordinate axes (an x-axis, a y-axis, and a z-axis) are shown in FIG. 1A through FIG. 8D concerning the first embodiment in common.

FIG. 1A, FIG. 1B, and FIG. 1C are views schematically showing a vibrator 1 that a vibration actuator has. FIG. 1A, FIG. 1B, and FIG. 1C are a plan view, a front view, and a right-side view that are based on a third angle system, respectively. The vibrator 1 has an elastic body 2 and an electro-mechanical energy conversion element 3 that is joined to the elastic body 2.

Figure 3A:
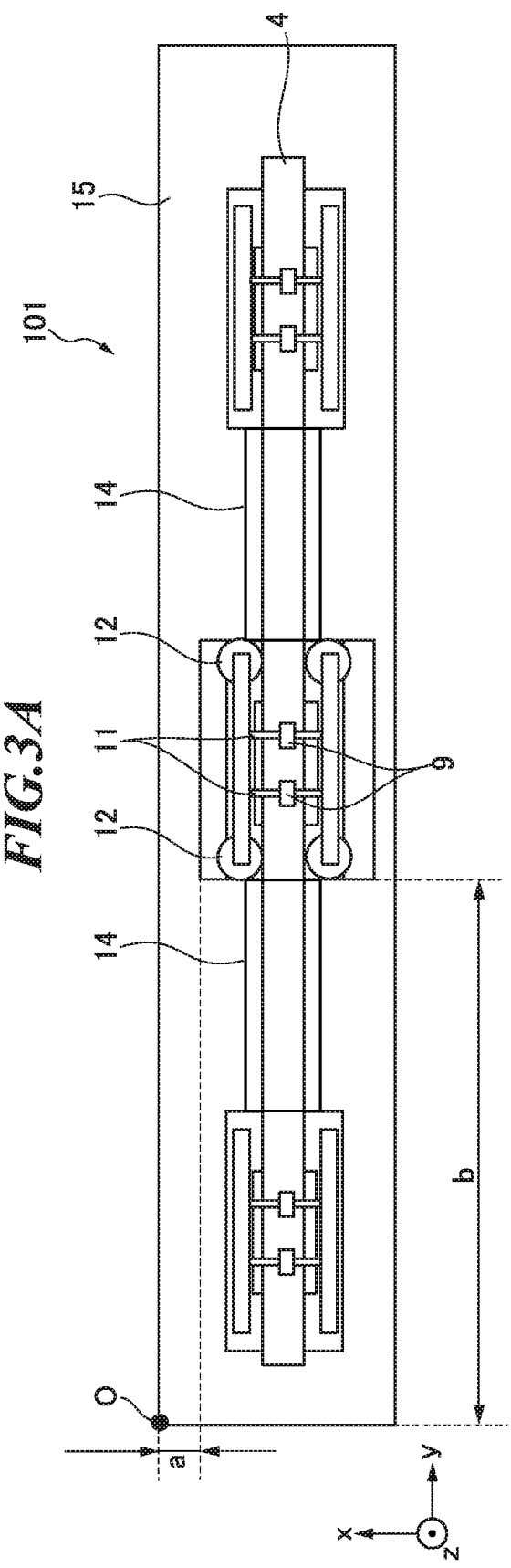
FIG. 3A and FIG. 3B are views schematically showing an overall configuration of a vibration actuator concerning the first embodiment of the present invention.
Figure 3B:
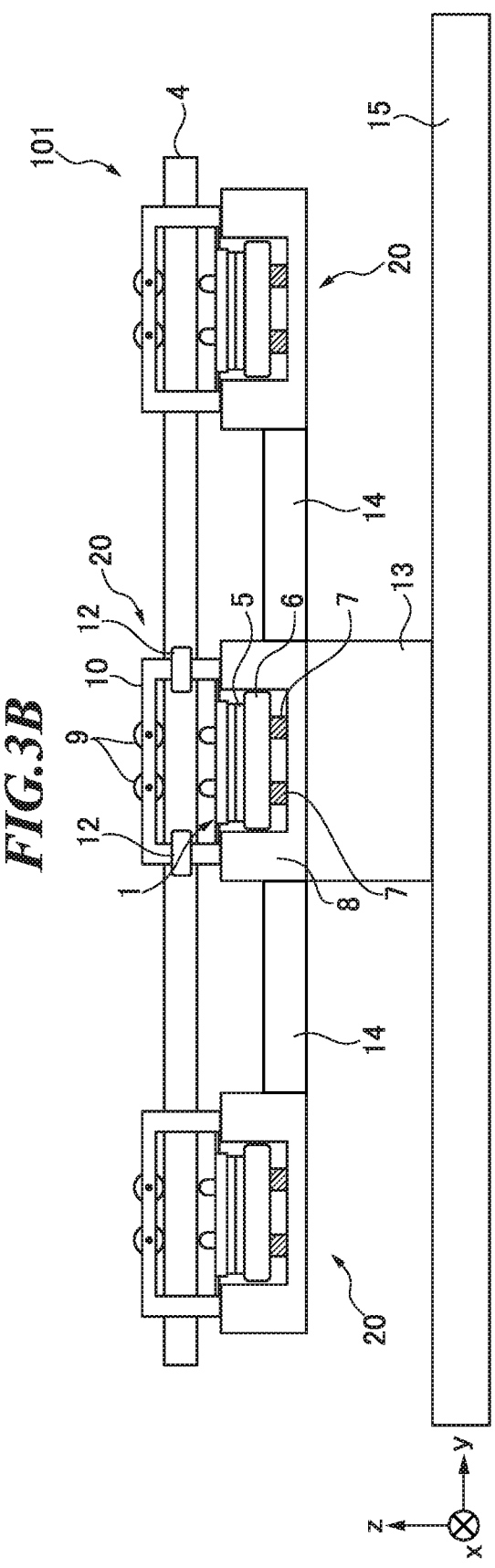

The electro-mechanical energy conversion element 3 is constituted by a piezoelectric device that converts voltage into force by a piezo-electric effect, for example. The electro-mechanical energy conversion element 3 has a plurality of electrodes to which corresponding voltages are applied. The elastic body 2 has projecting parts 2a, suspension members 2b, and support ends 2c. The projecting parts 2a are protrusion members that are projected in the z-axis direction that intersects perpendicularly with an x-y plane in which the elastic body 2 extends. The support ends 2c are rectangular parallelepiped members that fix and support the vibrator 1 to a holding member 8 mentioned later (FIG. 3B). The suspension members 2b are bridge members that connect a main body of the elastic body 2 on which the projecting parts 2a are provided to the support ends 2c. The vibrator 1 is pressed against a contact member 4 with suitable pressure forces applied by pressurizing members 7 mentioned later (FIG. 3B) through the two projecting parts 2a.

Figure 2B:
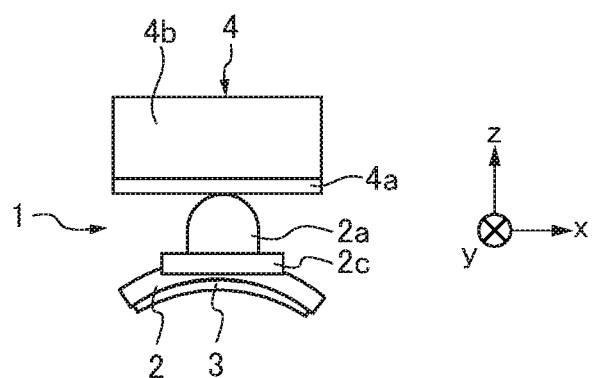
Figure 2C:
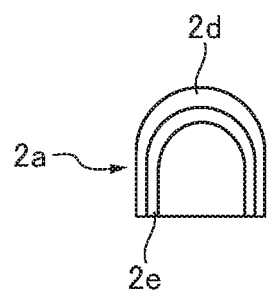

FIG. 2A, FIG. 2B, and FIG. 2C are explanatory views showing two vibration modes (vibration forms) excited in the vibrator 1 concerning the first embodiment of the present invention. When several alternating voltages of which phases are different mutually are applied to the electrodes of the electro-mechanical energy conversion element 3, the vibrations of two out-of-plane bending modes are excited in the vibrator 1 as shown in FIG. 2A and FIG. 2B.

FIG. 2A shows a secondary out-of-plane bending vibration mode that causes three nodal lines parallel to the x-axis direction in a rectangle portion of the vibrator 1 except the projecting parts 2a, the suspension members 2b, and the support ends 2c. The vibration of the above secondary out-of-plane bending vibration mode excites vibrations causing displacement in the direction (y-axis direction) parallel to the surface in contact with the contact member 4 at the front ends of the two projecting parts 2a.

In the meantime, FIG. 2B shows a primary out-of-plane bending vibration mode that causes two nodal lines parallel to the y-axis direction that is a longitudinal direction of the vibrator 1 in the rectangle portion of the vibrator 1. The vibration of the above primary out-of-plane bending vibration mode excites vibrations causing displacement in the direction (z-axis direction) perpendicular to the surface in contact with the contact member 4 at the front ends of the two projecting parts 2a.

Elliptic movements in the x-y plane occur at the front ends of the two projecting parts 2a by combining the vibrations in the above-mentioned two vibration modes. This consequently causes frictional force that relatively moves the contact member 4 in the y-axis direction between the projecting parts 2a and the contact member 4. It should be noted that a vibrator that excites vibration in another vibration mode as disclosed in Japanese Laid-open Patent Publication (Kokai) No. S63-316675 may be employed in place of the vibrator 1 mentioned above.

Moreover, vibrations in a vibration mode that causes displacement of the front ends of the two projecting parts 3a in a direction perpendicular to a contact surface shown in FIG. 2B may be only excited in the vibrator 1 in place of the elliptic movements by the projecting parts 2a. In such a case, the frictional force acting between the projecting parts 2a and the contact member 4 is changed by controlling vibration amplitude in the above-mentioned vibration mode. In a state where no voltage is applied to the electro-mechanical energy conversion element 3, static friction force between the projecting parts 2a and the contact member 4 acts as holding force. Since the contact time of the projecting parts 2a and the contact member 4 varies by applying voltage to the electro-mechanical energy conversion element 3 to change the vibration amplitude, apparent frictional force acting between the projecting parts 2a and the contact member 4 can be changed. The above configuration is able to change the reaction force that occurs when external force is added to the contact member 4 for displacement. For example, when a user uses the vibration actuator having the vibrator 1 or various devices using this actuator, it is possible to change the reaction force of operation that the user receives when the user operates by adding external force to the contact member 4.

Next, materials that form the vibrator 1 and the contact member 4 will be described. The elastic body 2 of the vibrator 1 can be made from material, such as martensitic stainless steel of low vibration loss, high toughness ceramic like partially stabilized zirconia (PSZ), engineering plastic like polyetheretherketone (PEEK-CF30) strengthened by carbon fiber of about 30 (wt %), semiconductor like silicon carbide (SiC), or aluminum alloy.

Moreover, the electro-mechanical energy conversion element 3 of the vibrator 1 can be made from electrostrictive ceramic, such as lead titanate-lead zirconate ($PbZrO_3$-$PbTiO_3$). The contact member 4 can be made from material such as the martensitic stainless steel mentioned above, engineering plastic like PEEK-CF30 strengthened by carbon fiber, or fine ceramic like partially stabilized zirconia (PSZ) or aluminum oxide.

FIG. 2C is a sectional view schematically showing one of the projecting parts 2a. It is suitable to achieve stable friction sliding characteristic between the elastic body 2 and the contact member 4 by providing a friction layer 2d on an outer surface of a base member 2e of the projecting part 2a as shown in FIG. 2C and by providing a friction layer 4a on a surface of a base member 4b of the contact member 4 as shown in FIG. 2A and FIG. 2B. When the base members 2e and 4b are made from martensitic stainless steel, the friction layers 2d and 4a can employ an electroless nickel plating film, a chromium plating film, a hardened layer by quenching, or a nitriding film by an ion nitriding treatment. The configuration combining the base member with the friction layer may be employed by making the base members 2e and 4b from engineering plastic like PEEK-CF30 strengthened by carbon fiber or hard ceramic.

An overall configuration of a vibration actuator 101 concerning the first embodiment of the present invention will be described by referring to FIG. 3A and FIG. 3B. FIG. 3A is a plan view, and FIG. 3B is a front view. The vibration actuator 101 has three vibrator devices 20 arranged in series in the y-axis direction (predetermined direction) in which the contact member 4 is moved. The three vibrator devices 20 move one contact member 4 in the y-axis direction.

Each vibrator device 20 has the vibrator 1, a nonwoven fabric 5, a spacer 6, the pressurizing members 7, a holding member 8, a pair of reaction force receiving members 9, a pair of mounts 10, and a pair of shafts 11. The support ends 2c of the vibrator 1 are fixed to an upper surface of a side wall of the holding member 8. Between the electro-mechanical energy conversion element 3 joined to the back of the elastic body 2 and the bottom of the holding member 8 holding the vibrator 1, the nonwoven fabric 5, spacer 6, and pressurizing members 7 are nipped in this order from the side of the vibrator 1.

The pressurizing members 7 press the projecting parts 2a of the vibrator 1 against the contact member 4 through the nonwoven fabric 5 and spacer 6. Each pressurizing member 7 is formed by a spring element that exhibits restoration force in the z-axis direction, such as a coil spring, a plate spring, a disk spring, a wave washer, rubber, or an air tube. The nonwoven fabric 5 is a cloth member formed by material like sheep wool felt and supports the vibrator 1 while maintaining the vibration mode that occurs in the vibrator 1. The spacer 6 levels the pressure forces from the pressurizing members 7 so as to reduce the variation of the pressure forces applied to the two projecting parts 2a. The spacer 6 is slidable in the z-axis direction along the inner wall of the holding member 8, and keeps the vibrator 1 to be approximately parallel to the x-y plane.

The reaction force receiving members 9 are provided in the opposite side (upper part in FIG. 3B) of the contact surface of the contact member 4 with the projecting parts 2a, and receive the reaction force against the pressure force that presses the vibrator 1 (projecting parts 2a) against the contact member 4. The two mounts 10 are fixed to the holding member 8. The reaction force receiving members 9 are rollers that are respectively attached to the two shafts 11 provided between the mounts 10 so as to rotate around center axes of the shafts 11 that are parallel to the x-axis.

As shown in FIG. 3B, the holding member 8 of the vibrator device (first vibrator device) 20 located in the center among the three vibrator devices 20 is fixed to a main body 15 by a restraint member 13. It should be noted that the restraint member 13 has only to fix the central vibrator device 20 to the main body in order to restrict the degree of freedom of the central vibrator device 20 in the y-axis direction. Moreover, the restraint member 13 may fix the central vibrator device 20 to a main body of a drive device to which the vibration actuator 1 is arranged or to a base (stationary part) provided in this drive device. The restraint member 13 positions the central vibrator device 20 relatively to the main body 15. More specifically, the restraint member 13 positions the central vibrator device 20 at the position that is displaced from a reference point O of the main body 15 by a distance a in the negative x-axis direction (downward in FIG. 3A) and by a distance b in the positive y-axis direction (rightward in FIG. 3A). The above positioning is performed by positioning means, such as a pin and a key, for example Four contact-member supporters 12 that are rollers rotatable around axes parallel to the z-axis are provided in the mounts 10 of the central vibrator device 20. The four contact-member supporters 12 restrict the degree of freedom of the contact member 4 in the x-axis direction (in-plane direction) and guide the contact member 4 in the y-axis direction. As mentioned above, the contact member 4 is positioned to the main body 15 with sufficient accuracy through the restraint member 13 by the reaction force receiving members 9 and the contact-member supporters 12 of the central vibrator device 20.

Moreover, as shown in FIG. 3A and FIG. 3B, the holding members 8 of the two vibrator devices (second vibrator devices) 20 located at both ends are respectively connected to the holding member 8 of the central vibrator device 20 via two flexible members 14 that extend in both directions of the y-axis. Each flexible member 14 has predetermined rigidity in the longitudinal direction (predetermined direction, y-axis direction) and has rigidity, which is lower than the predetermined rigidity, in directions other than the longitudinal direction, such as bending directions (directions (x-axis direction, z-axis direction) perpendicular to the longitudinal direction, for example) and twist directions. The flexible members 14 support the vibrator devices 20 at both ends so as to be movable in the directions (the bending directions and the twist directions) other than the longitudinal direction, and deform along the shape of the contact member 4 according to movements of the vibrator devices 20 at both ends. It should be noted that the longitudinal direction mentioned above includes a direction (compression direction) in which the contact member 4 compresses the flexible member 14 and a direction (pulling direction) in which the contact member 4 pulls the flexible member 14.

When the plurality of vibrator devices 20 are provided in the vibration actuator 101 in order to improve thrust and torque like this embodiment, the size of the contact member 4 in the moving direction (y-axis direction) becomes large as compared with thickness (size in the z-axis direction) and width (size in the x-axis direction). As a result, since the contact member 4 bends or twists in the moving direction owing to component processing of the contact member 4 and residual strain of use material as a result, it becomes hard to form the contact member 4 with sufficient accuracy.

Moreover, if the thickness of the contact member 4 is made thin for miniaturization, the above-mentioned problem will become more remarkable and it will become harder to form the contact member 4 with the sufficient accuracy. Even if the shape of the contact member 4 is processible with sufficient accuracy, it will be easily estimated that the shape of the contact member 4 will vary (bending or twist in the longitudinal direction will occur) resulting from temporal change and heat treatment, such as quenching, ion nitriding treatment, and annealing treatment.

That is, it is hard to avoid the deformation of the contact member 4 in the configuration that the vibration actuator 101 is provided with a plurality of vibrator devices 20.

Since the deformation of the contact member 4 changes the relative position between each of the vibrator devices 20 and the contact member 4 in the pressurizing direction (z-axis direction), the pressure forces that press the vibrators 1 against the contact member 4 differ among the vibrator devices 20. The above variation may further increase by the movement of the contact member 4. Since the frictional force against the contact member 4 of the vibrator 1 of which pressure force becomes small relatively is lowered, thrust and torque may be lowered. In the meantime, in the vibrator 1 of which pressure force becomes large relatively, excessive face pressure between the contact member 4 and the vibrator 1 may cause anomalous attrition, and excessive frictional force may deform or break the suspension members 2b holding the vibrator 1.

However, in this embodiment, since the vibrator devices 20 at both ends of the vibration actuator 101 are supported so as to be swingable in the z-axis direction (direction perpendicular to the moving direction of the contact member 4), occurrence of the problem mentioned above is reduced. More details are described as follows.

Figure 4:
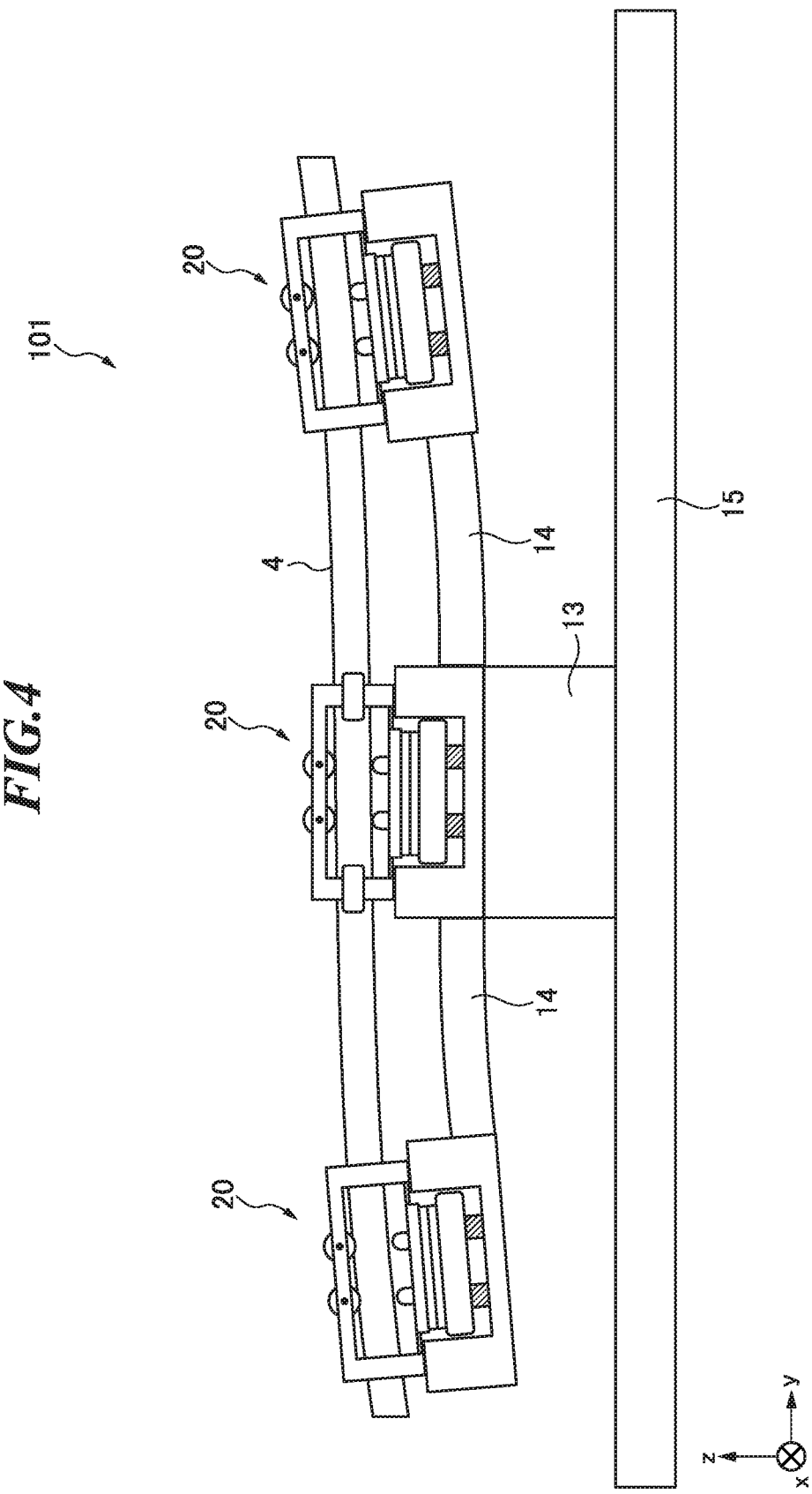
FIG. 4 is a front view showing behavior of the vibration actuator concerning the first embodiment of the present invention in a case where the contact member is distorted.

Behavior of the vibration actuator 101 in a case where the contact member 4 is distorted in the plane parallel to the y-z plane is described by referring to FIG. 4. As shown in FIG. 4, the vibrator devices 20 at both ends move in the z-axis direction by following distortion of the contact member 4 through the flexible members 14.

Since the vibrator devices 20 at both ends follow the deformation of the contact member 4 even when the contact member 4 is deformed in the y-axis direction by bending or twist, variation in the pressure force of the vibrator 1 against the contact member 4 and variation of the reaction force that occurs in the reaction force receiving member 9 among the vibrator devices 20 can be reduced. As a result, the plurality of vibrator devices 20 are able to generate thrust appropriately and efficiently to the contact member 4, and wear and breakage due to excessive force can be prevented.

Figure 5:
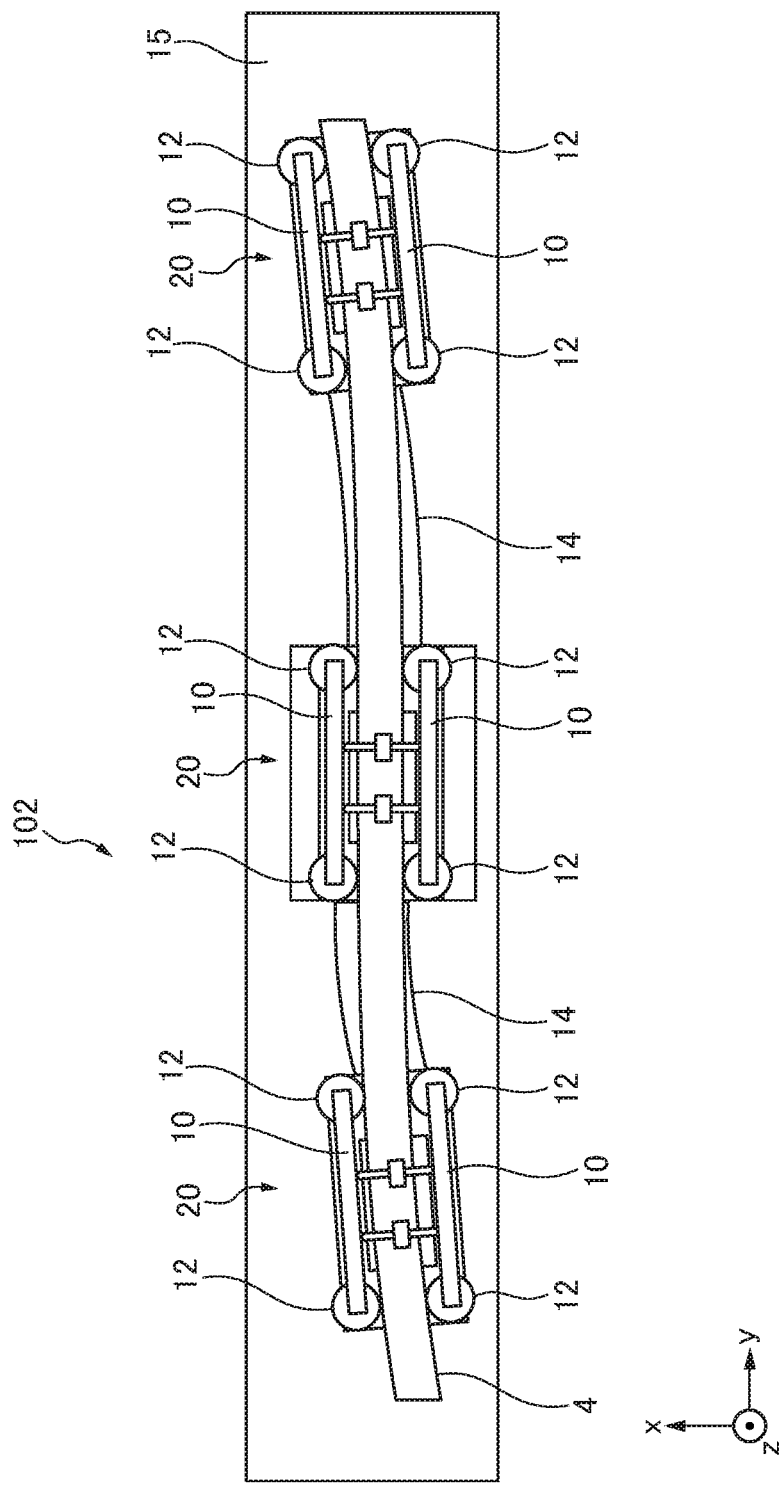
FIG. 5 is a plan view showing behavior of the vibration actuator concerning the first embodiment of the present invention in a case where the contact member is distorted.

Behavior of a vibration actuator 102 in a case where the contact member 4 is distorted in the plane parallel to the x-y plane is described by referring to FIG. 5.

In the vibration actuator 102, the four contact-member supporters 12 as rollers that are respectively rotatable around axes parallel to the z-axis are also provided in the mounts 10 of each of the vibrator devices 20 at both ends so as to nip the contact member 4. Accordingly, since the vibrator devices 20 at both ends follow deformation of the contact member 4, the vibrator devices 20 are able to generate thrust appropriately and efficiently to the contact member 4, and wear and breakage due to excessive force can be prevented.

FIG. 6 is a front view schematically showing another vibration actuator 103 concerning the first embodiment of the present invention. Each vibrator device 20 has a holding member 18 equivalent to a configuration that the holding member 8 and the mounts 10 shown in FIG. 3A and FIG. 3B are combined. Four contact-member supporters 12 that are rollers rotatable around axes parallel to the z-axis are provided in the holding member 18 of the central vibrator device 20. In the vibration actuator 103, center axes 16 of the flexible members 14 that connect the vibrator devices 20 are located on the same plane as a friction sliding surface of the contact member 14 that the projecting parts 2a contact. The above configuration is able to reduce an angular moment in the y-z plane that occurs when each of the vibrator devices 20 at both ends generates thrust in the y-axis direction because the center of the flexible member 14 coincides with the friction sliding surface. As a result, the deformation of the flexible member 14 is reduced, and the vibrator devices 20 are able to generate thrust more efficiently against the contact member 4.

Figure 7A:
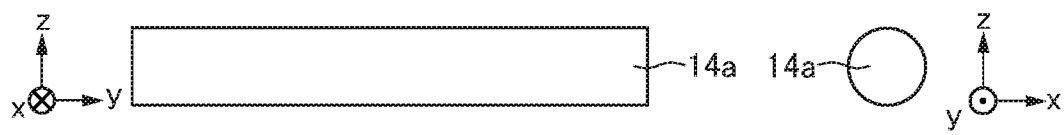
FIG. 7A through FIG. 7F are explanatory views showing various configuration examples of a flexible member concerning the first embodiment of the present invention.
Figure 7B:
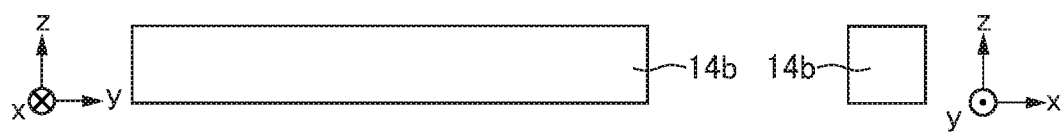
Figure 7C:
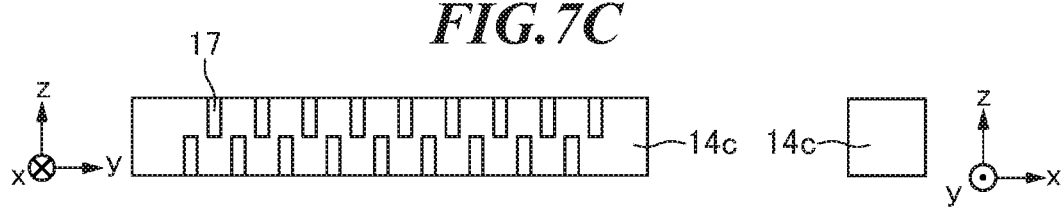

Various configuration examples of the flexible member 14 concerning the first embodiment of the present invention will be described by referring to FIG. 7A through FIG. 7F. FIG. 7A includes a front view and side view showing a cylindrical flexible member 14a of which section is a circle. FIG. 7B includes a front view and side view showing a rectangular parallelepiped flexible member 14b of which section is a rectangle. FIG. 7C includes a front view and side view showing a flexible member 14c that has a plurality of grooves 17 extended in the x-z plane direction. The grooves 17 lower the rigidity of the flexible member 14c in the directions other than the y-axis direction.

Figure 7D:
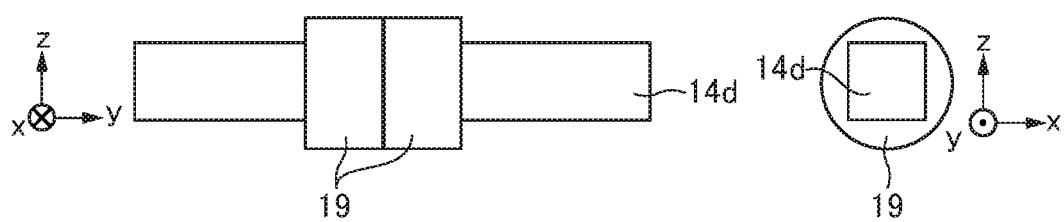

FIG. 7D includes a front view and side view showing a flexible member 14d that has two rotation sections 19 that are rotatable around an axis parallel to the y-axis near the center in the y-axis direction. A torsion spring that gives predetermined elasticity may be provided between the two rotation sections 19. The vibrator device 20 is able to follow deformation of the contact member 4 in an out-of-plane direction because the flexible member 14d rotates around the rotation axis of the rotation sections 19.

Figure 7E:
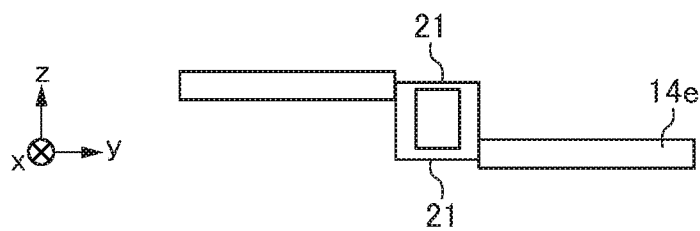
Figure 7F:
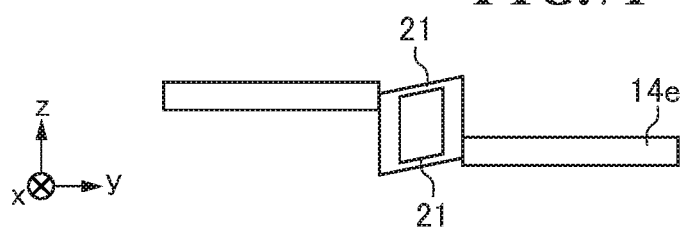

FIG. 7E and FIG. 7F are front views showing a flexible member 14e that has a parallel spring 21 in the center. When the contact member 4 is deformed in a plane parallel to the y-z plane, the parallel spring 21 of the flexible member 14e will be also deformed as shown in FIG. 7F. As a result, each of the vibrator devices 20 at both ends connected by the flexible member 14e follows deformation of the contact member 4. According to the above configuration, since the deformation of the parallel spring 21 reduces the rotation of each vibrator device 20 around the axis parallel to the x-axis, each vibrator device 20 follows the contact member 4 while keeping parallel relationship in the y-axis. Moreover, since the directions of the thrusts of the vibration devices 20 approach so as to meet the direction parallel to the y-axis, the total thrust of the vibration actuator increases more.

Figure 8A:
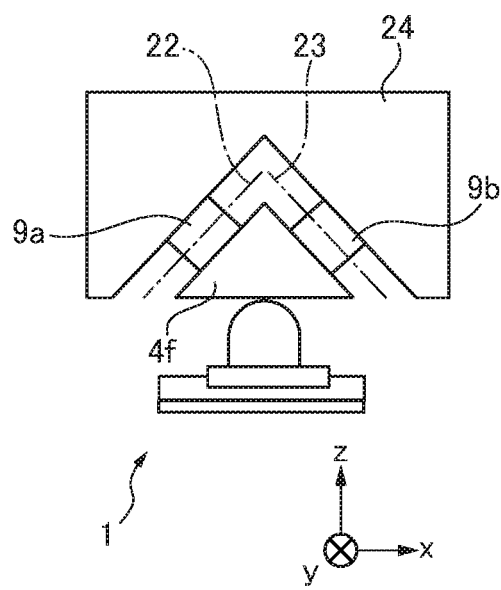
FIG. 8A through FIG. 8D are explanatory views showing configurations that combine a reaction force receiving member with a contact-member supporter in the first embodiment of the present invention.

FIG. 8A shows rollers 9a and 9b that function as the reaction force receiving members and contact-member supporters. In this example, a mount 24 that has a V-shaped groove as shown in FIG. 8A is employed in place of the mount 10 shown in FIG. 3A and FIG. 3B, and two kinds of rollers 9a and 9b are provided in the mount 24. In this example, the vibrator 1 presses a contact member 4f that has a triangular section in the z-axis direction (upward in FIG. 8A). The rollers 9a and 9b respectively rotate around rotation axes 22 and 23 by following the movement of the contact member 4f. The rollers 9a and 9b function as the reaction force receiving members that receive reaction force against the pressure force in the z-axis direction by the pressure to the contact member 4f and function as the contact-member supporters that restrict the degree of freedom in the x-axis direction of the contact member 4f.

Figure 8B:
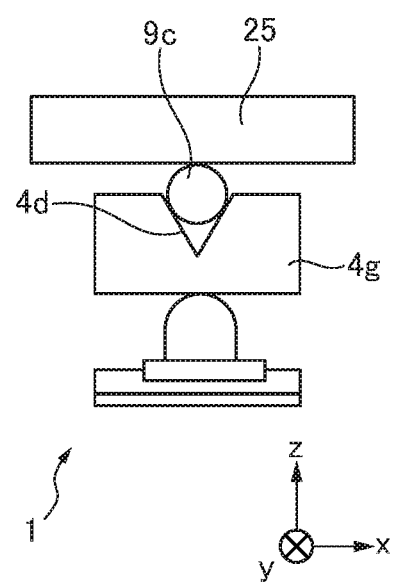

FIG. 8B shows a rolling element 9c that functions as the reaction force receiving member and contact-member supporter. In this example, a mount 25 shown in FIG. 8B is employed in place of the mount 10 shown in FIG. 3A and FIG. 3B, and the spherical rolling element 9c is provided to the mount 25. The vibrator 1 presses a contact member 4g in which a V-shaped groove 4d extending in the y-axis direction is provided in the z-axis direction (upward in FIG. 8B). The rolling element 9c fit into the groove 4d of the contact member 4g functions as the reaction force receiving member that receives reaction force against the pressure force in the z-axis direction by the pressure to the contact member 4g and functions as the contact-member supporter that restricts the degree of freedom in the x-axis direction of the contact member 4g.

Figure 8C:
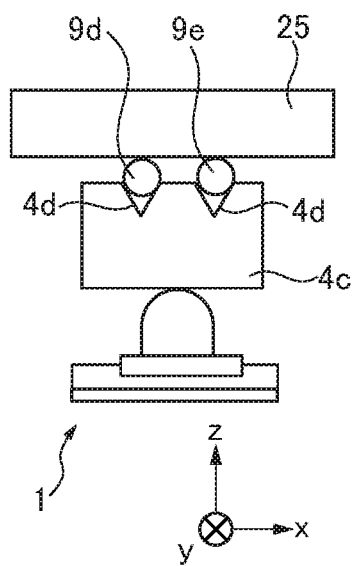

As shown in FIG. 8C, rolling elements 9d and 9e similar to the rolling element 9c shown in FIG. 8B may be provided in two V-shaped grooves 4d formed in a contact member 4c.

Figure 8D:
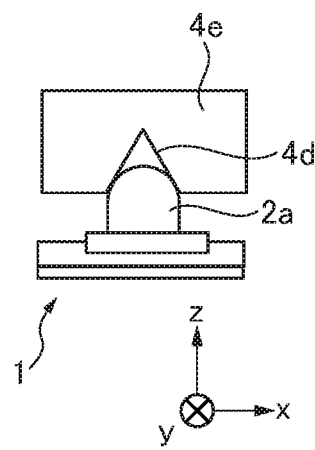

Otherwise, the projecting part 2a may be pressed against slant faces of a V-shaped groove 4d formed in a friction sliding surface of a contact member 4e as shown in FIG. 8D. In this example, the projecting part 2a of the vibrator 1 functions as the reaction force receiving member and contact-member supporter. The above-mentioned configurations decrease the number of components of the vibrator device 20 and simplify the configuration.

Although the vibration actuators 101, 102, and 103 that have the three vibrator devices 20 are described in the above-mentioned description, this embodiment is not limited to the above-mentioned configurations. The number of the vibrator devices included in the vibration actuator may be changed suitably according to specifications, such as length and thrust, of the vibration actuator.

Although the vibration actuator in which the central vibrator device is fixed by the restraint member 13 and the vibrator devices at both ends are arranged to be movable in at least the z-axial directions is described in the above description, this embodiment is not limited to the above-mentioned configuration. The restraint member 13 may be provided in an arbitrary position of the vibration actuator. Moreover, a plurality of restraint members 13 may be provided in the vibration actuator.

Although the four contact-member supporters 12 are provided in the vibrator device 20 that has the restraint member 13 in the above-mentioned configurations, the number of the contact-member supporters of the vibration actuator should be three or more. At least one of the three or more contact-member supporters 12 should be provided in the vibrator device 20 that has the restraint member 13, and the other contact-member supporters 12 may be provided in the vibrator device 20 that does not have the restraint member 13.

In the above-mentioned configurations, the reaction force receiving members 9 and the contact-member supporters 12 are the rollers that are rotatable around the axes at the predetermined positions and support the contact member. In the meantime, a roller of a constant pressure preload system that has a rotation shaft and pressed by an elastic member like a spring against the contact member or an arbitrary slide guiding mechanism that can support the contact member may be employed as the reaction force receiving member and contact-member supporter. The number, shape, and arranged positions of the reaction force receiving members 9 in the one vibrator device 20 are arbitrary. An arbitrary component that can receive the pressure reaction force of the vibrator 1 against the contact member 4 (4c through 4g) may be employed as the reaction force receiving member 9.

In the above-mentioned configuration, the contact member 4 (4c through 4g) is described as a rectangular parallelepiped flexible member that extends in the y-axis direction and is formed integrally. In the meantime, the contact member may be formed by connecting a plurality of strip-like contact-member elements in series.

Although it is described that the plurality of vibrator devices are fixed and move the contact member in the above-mentioned configuration, this embodiment is applicable also to the configuration where the plurality of vibrator devices move with respect to the fixed contact member. That is, the vibration actuator of this embodiment has only to move the contact member and the plurality of vibrators relatively in a predetermined direction.

In this embodiment, although the holding member, mount, flexible member, and restraint member are exemplified as independent components, two or more components among these components may be formed as an integral component. For example, when an integral component is formed by a method like an injection molding, the number of components and cost can be reduced. Furthermore, backlash and error that occur by attachment of components can be reduced.

Next, a vibration actuator concerning a second embodiment of the present invention will be described by referring to FIG. 9 through FIG. 16D. It should be noted that the coordinate axes (the x-axis, y-axis, and z-axis) are shown in FIG. 9 through FIG. 16D concerning the second embodiment in common as with the first embodiment. It should be noted that a reference numeral referred in the above description is diverted to a component of which an effect and a function are equivalent to the component in the first embodiment and its description is omitted suitably in embodiments exemplified below.

FIG. 9 is a front view schematically showing a vibration actuator 201 concerning the second embodiment of the present invention. The vibration actuator 201 has three vibrator devices 30 arranged in series in the y-axis direction (predetermined direction) in which the contact member 4 is moved. The three vibrator devices 30 move one contact member 4 in the y-axis direction.

Each vibrator device 30 has the two vibrators 1 that are arranged so as to face each other across the contact member 4. The projecting parts 2a of each vibrator 1 are pressed against the contact member 4. As compared with the first embodiment, the vibrator device 30 of the second embodiment is equivalent to a configuration that the reaction force receiving members 9 of the vibrator device 20 of the first embodiment are replaced with the projecting parts 2a of the vibrator 1. The friction layers 4a (see FIG. 2A) are preferably provided on both sides of the contact member 4. A holding member 26 is equivalent to a configuration that combines the holding member 8 and mounts 10 of the vibrator device 20 of the first embodiment. The vibrators 1 held by the holding member 26 pressurize the contact member 4 by the same mechanism as the first embodiment.

As shown in FIG. 9, the contact-member supporters 12 are provided in the ends of the two vibrator devices 30 located at both ends among the three vibrator devices 30. The contact-member supporter 12 is arranged on the holding member 26, restricts the degree of freedom of the contact member 4 in the x-axis direction, and guides the contact member 4 in the y-axis direction. The vibrator device 30 at the left end in FIG. 9 has a restraint member 31 of a rotary fulcrum type. The restraint member 31 supports the corresponding vibrator device 30 so as to be pivotable around a fulcrum A within a plane parallel to the y-z plane and restricts the position in the y-axis direction and z-axis direction. The restraint member 31 is constituted by a hinge or an elastic hinge, for example. In the meantime, the vibrator device 30 at the right end in FIG. 9 has a restraint member 32 of a movable fulcrum type. The restraint member 32 supports the corresponding vibrator device 30 so as to be pivotable around a point B within a plane parallel to the y-z plane and restricts the position in the z-axis direction. The restraint member 32 is constituted including rollers, for example. The holding member 26 of the left-end vibrator device 30 is fixed to the main body 15 by the restraint member 31. The restraint member 31 may fix the left-end vibrator device 30 to the main body 15 of the vibration actuator 201 like this embodiment, or may fix it to a main body of a drive device or another device to which the vibration actuator 201 is arranged. The restraint member 31 positions the left-end vibrator device 30 relatively to the main body 15. The contact member 4 is positioned on the main body 15 through the restraint member 31 with sufficient accuracy. In the meantime, the central vibrator device 30 is connected with the vibrator devices 30 at both ends through the flexible members 14, so that the position in the y-axis direction is restricted. The center axes 16 of the flexible members 14 preferably agree with the center axis of the contact member 4. In other words, the center axes 16 are preferably located on a straight line connecting the middle points of the plurality of sets of the oppositely arranged projecting parts 2a (on a middle plane between two friction sliding surfaces of the contact member 4 that the oppositely arranged vibrators 1 contact). Moreover, employment of the configuration of this example is more suitable when the length of the y-axis direction of the vibration actuator is more than a predetermined length.

Since the reaction force receiving members 9 of the first embodiment are replaced with the projecting parts 2a of the vibrator 1, the number of the projecting parts 2a that contact with the contact member 4 increases, which increases the thrust. Moreover, since the contact-member supporters 12 are provided in the vibrator devices 30 at both ends, the position accuracy of the in-plane direction of the contact member 4 is further improved.

Moreover, since one of the restraint members is the restraint member 32 of the movable fulcrum type, the restraint member 32 can absorb the displacement of the vibrator devices 30 in the y-axis direction due to deformation of the flexible member 14. As a result, the variation of the pressure forces caused by the projecting parts 2a of the vibrator devices 30 against the contact member 4 is reduced.

Furthermore, since the center axes 16 of the flexible members 14 are located on the center axis of the contact member 4, the angular moment in the y-z plane that occurs when the vibrator device 30 of the end generates the thrust in the y-axis direction can be reduced. As a result, the deformation of the flexible member 14 is reduced, and the vibrator devices 30 are able to generate thrust more efficiently against the contact member 4.

Figure 10:
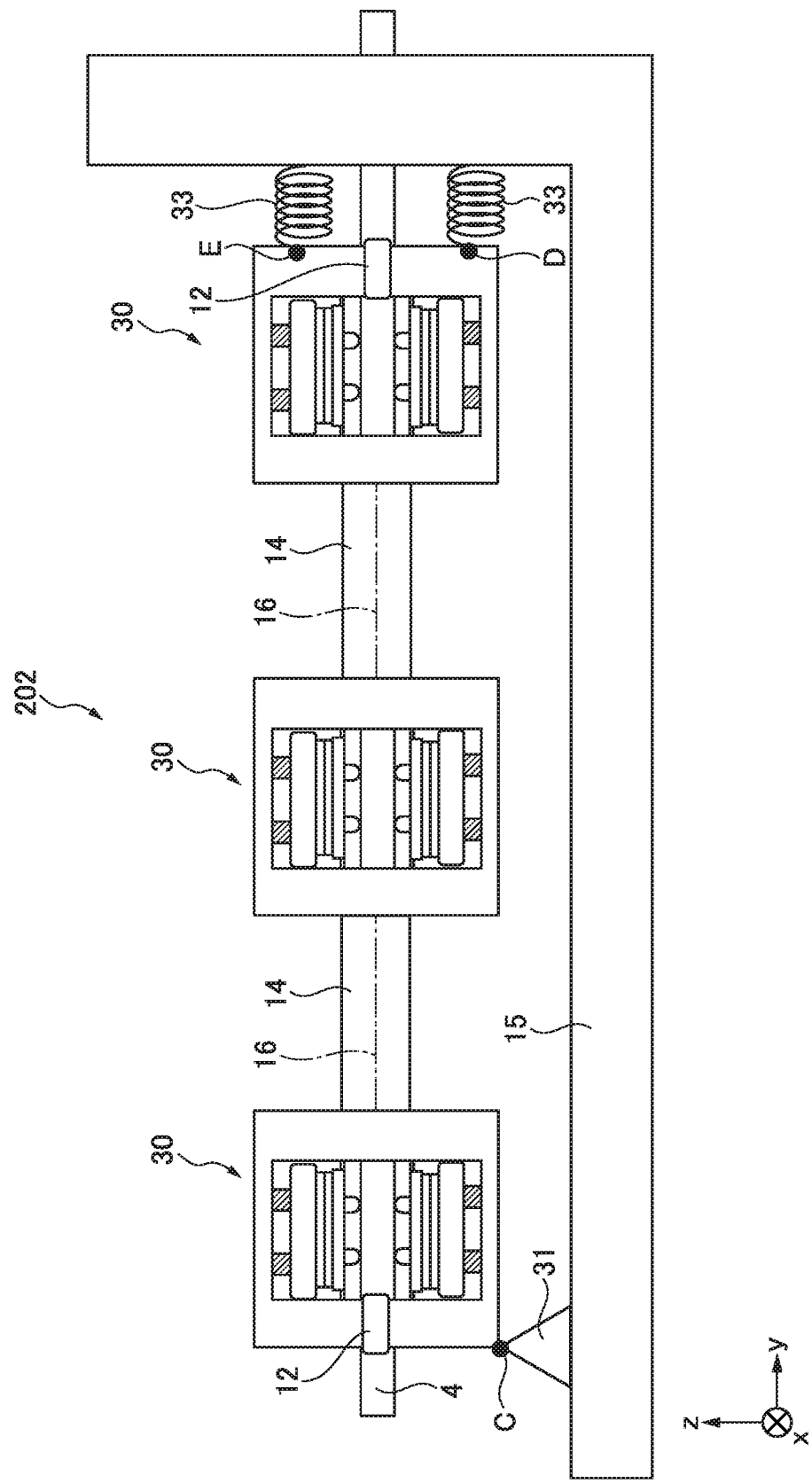
FIG. 10 is a front view schematically showing another vibration actuator concerning the second embodiment of the present invention.

FIG. 10 is a front view schematically showing another vibration actuator 202 concerning the second embodiment of the present invention. The left-end vibrator device 30 is restricted by the main body 15 like FIG. 9 by the restraint member 31 of the rotary fulcrum type that is pivotable around a fulcrum C. The right-end vibrator device 30 is preloaded and is supported by elastic elements 33 like coil springs at points D and E. The other configurations are the same as that of FIG. 9.

According to the above configuration, since one end of the vibrator devices 30 is supported by the elastic elements 33, the supporting mechanism that is pivotable around the fulcrum C is achievable for supporting the contact member 4.

FIG. 11 is a front view schematically showing another vibration actuator 203 concerning the second embodiment of the present invention. The vibration actuator 203 has four vibrator devices 30 arranged in series in the y-axis direction. The vibrator devices 30 at both ends are respectively restricted and positioned to the main body 15 by the restraint members 31 of the rotary fulcrum type that are pivotable around fulcrums F and G. The left-end vibrator device 30 and the adjacent vibrator device 30 are connected by the flexible member 14. The right-end vibrator device 30 and the adjacent vibrator device 30 are connected by the flexible member 14. The two central vibrator devices 30 other than those at both ends are not connected.

According to the above configuration, the two restraint members 31 are provided and the contact member 4 is supported by the group of the vibrator devices 30 that are pivotable around the fulcrum F and the group of the vibrator devices 30 that are pivotable around the fulcrum G.

Although the right-end vibrator device 30 in FIG. 9 is movable in the y-axis direction, the position of the right-end vibrator device 30 in FIG. 11 is restricted. In the meantime, since the two central vibrator devices 30 are not connected by the flexible member 14, the displacement of the vibrator devices 30 due to deformation of the contact member 4 is released (is absorbed). As a result, the variation of the pressure forces caused by the projecting parts 2a of the vibrator devices 30 against the contact member 4 is reduced.

FIG. 12A and FIG. 12B are views schematically showing another vibration actuator 204 concerning the second embodiment of the present invention. FIG. 12A is a plan view, and FIG. 12B is a front view. The vibration actuator 204 moves the one contact member 4 in the y-axis direction by the three vibrator devices 30.

The vibrator devices 30 at both ends are respectively restricted and positioned to the main body 15 by the restraint members 31 of the rotary fulcrum type that are pivotable around fulcrums H and I. The left-end vibrator device 30 and the adjacent vibrator device 30 are connected by the flexible member 14. The contact-member supporters 12 that restrict displacement of the contact member 4 in a direction around an axis parallel to the z-axis and guide it in the y-axis direction are provided at both ends of the main body 15. The contact-member supporters 12 are rollers rotatable around the axes, for example.

According to the above configuration, since the contact-member supporters 12 are directly attached to the main body 15 and are positioned, the contact member 4 can be positioned with more sufficient accuracy to the main body 15. Furthermore, since a part of the vibrator devices 30 that are restricted by the restraint members 31 is not connected by the flexible member 14 as with the configuration of FIG. 11, the displacement of the contact member 4 in the y-axis direction is absorbable. As a result, the variation of the pressure forces caused by the projecting parts 2a of the vibrator devices 30 against the contact member 4 is reduced.

Figure 13A:
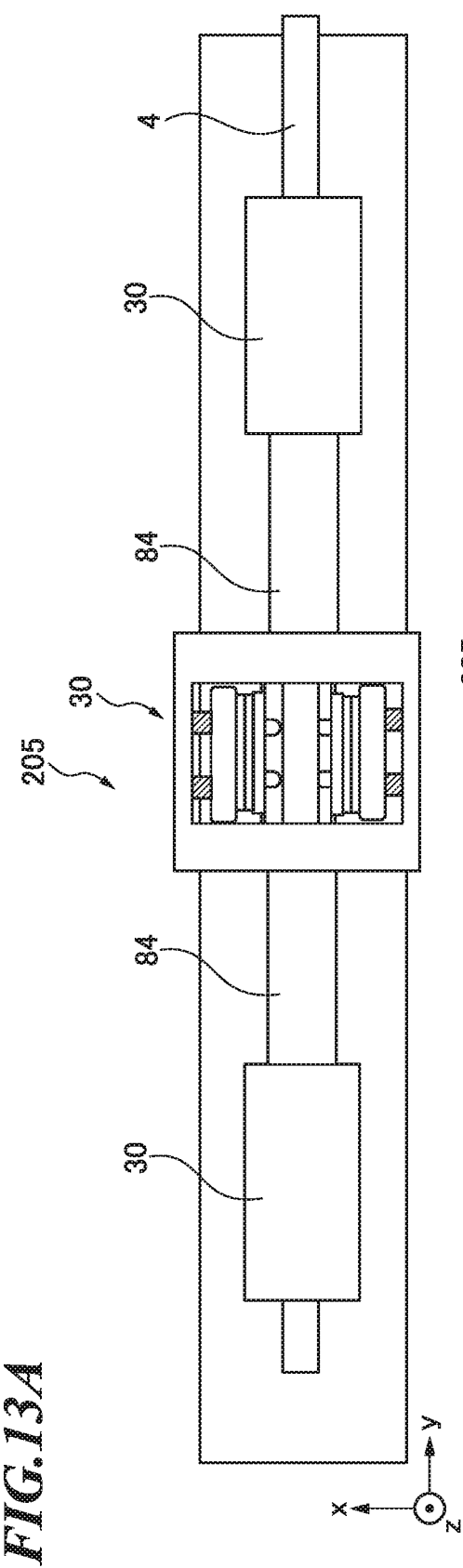
FIG. 13A and FIG. 13B are views schematically showing another vibrator device concerning the second embodiment of the present invention.
Figure 13B:
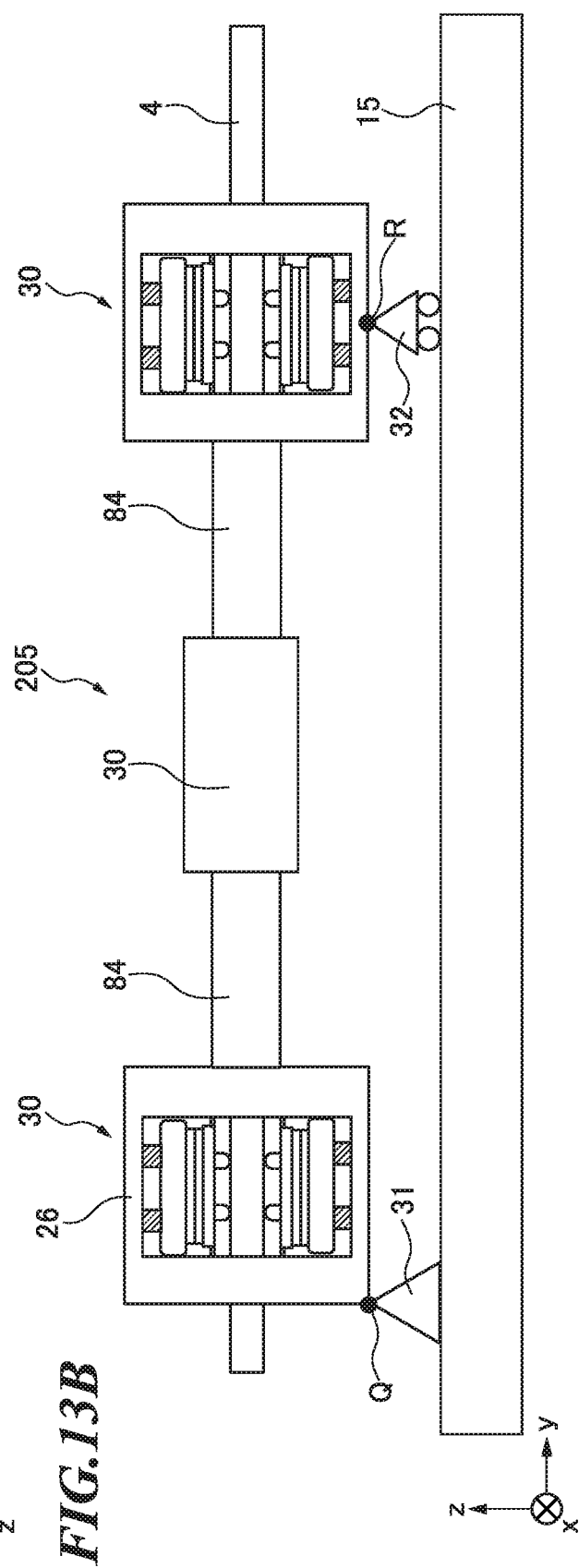

FIG. 13A and FIG. 13B are views schematically showing another vibration actuator 205 concerning the second embodiment of the present invention. FIG. 13A is a plan view, and FIG. 13B is a front view.

The vibration actuator 205 has the three vibrator devices 30 that move the contact member 4 in the y-axis direction. The central vibrator device 30 is arranged in a state where it is rotated by 90 degrees from the vibrator devices 30 at both ends around an axis parallel to the y-axis. The vibrator devices 30 at both ends are respectively restricted by the restraint member 31 of the rotary fulcrum type and the restraint member 32 of the movable fulcrum type that are pivotable around fulcrums Q and R as with the configuration of FIG. 9. The central vibrator device 30 is connected with the vibrator devices 30 at both ends by flexible members 84.

Like the flexible member 14, the flexible member 84 has predetermined rigidity in the longitudinal direction and has rigidity, which is lower than the predetermined rigidity, in directions other than the longitudinal direction, such as a bending direction and a twist direction. In addition, the flexible member 84 has a hollow form so that the contact member 4 can pass through the inside.

According to the above configuration, since the plurality of vibrator devices 30 are arranged at different angles in a plane (z-x plane) perpendicular to the moving direction of the contact member 4, the projecting parts 2a are also arranged at different angles. As a result, the projecting parts 2a of the vibrators 1 can bear the function of the contact-member supporters 12. Accordingly, the contact-member supporters 12 can be omitted, which achieves miniaturization and weight saving accompanying reduction of the number of components.

Various configuration examples of the vibrator 1 of the vibrator device that can support the contact member will be described by referring to FIG. 14A through FIG. 14F. FIG. 14A through FIG. 14F are side views that exemplify the support methods for the contact member. The nonwoven fabric, spacer, pressurizing member, and holding member are not shown but they are constituted as mentioned above so as to press the vibrator 1 against the contact member.

FIG. 14A shows an example in which the two vibrators 1 that are oppositely arranged in the above-mentioned vibrator device 30 support and guide the contact member 4. FIG. 14B shows an example in which the four vibrators 1 respectively support and guide four side surfaces of a contact member 74 having a rectangular section. FIG. 14C shows an example in which the three vibrators 1 that are arranged at angular intervals of about 120 degrees in the x-z plane support and guide a cylindrical side surface of a contact member 75 having an approximately circular section. FIG. 14D shows an example in which the three vibrators 1 that are arranged at angular intervals of about 120 degrees in the x-z plane support and guide side surfaces of a contact member 76 having a hexagonal section. FIG. 14E shows an example in which the vibrator 1 and two vibrators 81 that are different in size and thrust to each other support and guide side surfaces of a contact member 77 having a polygonal section. FIG. 14F shows an example in which the two vibrators 1 and the two reaction force receiving members 9 support and guide the cylindrical side surface of the contact member 75 having the approximately circular section.

According to the above configurations, the vibrators 1 are able to support and guide the contact members having various sectional shapes appropriately.

Figure 15A:
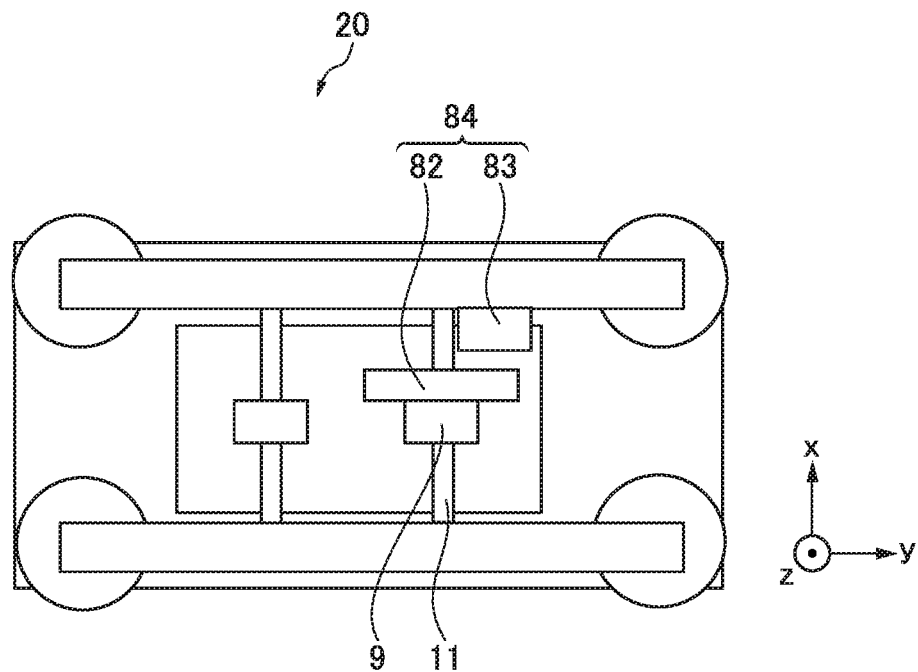
FIG. 15A and FIG. 15B are explanatory views showing configuration examples of a vibrator device that has a displacement detection unit.
Figure 15B:
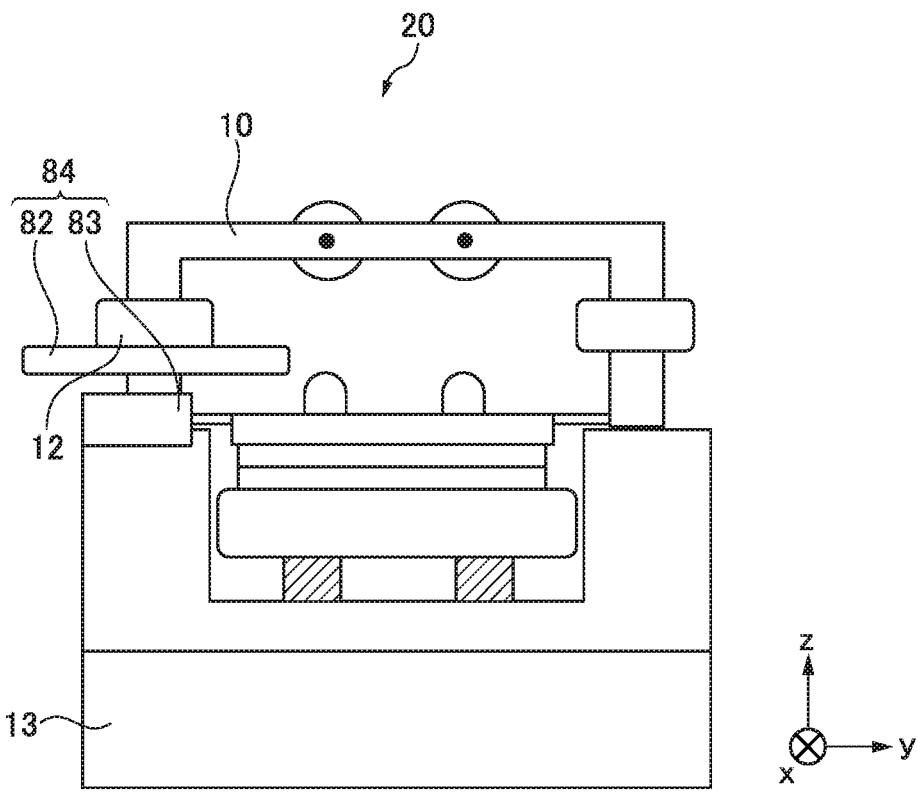

Configuration examples of vibrator devices that have a displacement detection unit 84 will be described by referring to FIG. 15A and FIG. 15B. These configuration examples are applicable to both of the first embodiment and the second embodiment. FIG. 15A is a plan view of a first example, and FIG. 15B is a front view of a second example. The displacement detection unit 84 has a scale 82 and a detector 83.

In the example shown in FIG. 15A, the scale 82 is attached to the shaft 11 to which the reaction force receiving member 9 is attached. And the scale 82 is restricted by the reaction force receiving member 9. The scale 82 rotates together with the reaction force receiving member 9 without slip in response to displacement of the contact member 4. The detector 83 detects displacement of the contact member 4 in the y-axis direction by reading rotational displacement of the scale 82.

In the example shown in FIG. 15B, the scale 82 is attached to the contact-member supporter 12 provided in the mount 10. The scale 82 rotates together with the contact-member supporter 12 in response to displacement of the contact member 4. The detector 83 detects displacement of the contact member 4 in the y-axis direction by reading rotational displacement of the scale 82. Conveyance parameters, such as a position, velocity, and acceleration, of the contact member 4 are controllable on the basis of the displacement of the contact member 4 in the y-axis direction that the detector 83 outputs.

In the two examples shown in FIG. 15A and FIG. 15B, the scale 82 is attached to the positions that do not interfere physically with the contact member 4. Although the displacement detection unit 84 is preferably provided in the vibrator device that has the restraint member 13 because the displacement is detected with sufficient accuracy, it may be provided in other positions. The displacement detection unit 84 may employ configurations based on arbitrary methods, such as an optical method, a magnetic method, and an electrostatic capacity method. When the configuration based on the optical method is employed, the above-mentioned displacement detection unit 84 of a reflection type may be employed or a displacement detection unit of a transmission type may be employed. In place of the above-mentioned displacement detection unit 84 of a rotary type, a displacement detection unit 84 of a linear motion type may be employed by arranging a linear scale 82 to the contact member 4 and by arranging the detector 83 to the vibrator device. When the above displacement detection unit 84 is applied to the vibrator device that is restricted by the restraint member 13 and is positioned to the main body 15, the relative position of the contact member 4 based on the main body 15 is detectable.

A configuration example of an actuator unit 206 that is unitized by equipping a vibration actuator with an exterior member 86 will be described by referring to FIG. 16A through FIG. 16D. This configuration example is applicable to both of the first embodiment and the second embodiment. FIG. 16A is a plan view, FIG. 16B is a front view, FIG. 16C is a side view, and FIG. 16D is a perspective view.

The actuator unit 206 is configured by fixing the main body 15 of the vibration actuator 204 to the exterior member 86. The contact member 4 can be moved in the y-axis direction through the side surface of the exterior member 86. In FIG. 16B, the vibration actuator 204 that is covered with the exterior member 86 and cannot be seen is shown by broken lines. As shown in FIG. 16A through FIG. 16D, the vibration actuator 204 is protected by packaging the vibration actuator 204 by the exterior member 86. Although the vibration actuator 204 is exemplified in FIG. 16A through FIG. 16D, any vibration actuators concerning the embodiments of the present invention can be unitized by applying the exterior member 86. It should be noted that exterior member 86 may be constituted integrally with the main body 15 or the restraint members 31.

Although the center axes 16 of the flexible members 14 agree with the center axis of the contact member 4 in the z-axis direction in the above-mentioned configuration, a configuration in which the center axes 16 of the flexible members 14 do not agree with the center axis of the contact member 4 may be employed.

In the above-mentioned configuration, the restraint member of the rotary fulcrum type and the restraint member of the movable fulcrum type are exemplified. Although the schematic configurations about the above restraint members have been described, the restraint member is achievable using any suitable machine elements or machine parts.

Next, a third embodiment of the present invention will be described. The third embodiment shows applications (drive devices) that use the vibration actuator of the above-mentioned first embodiment or the second embodiment.

Figure 17:
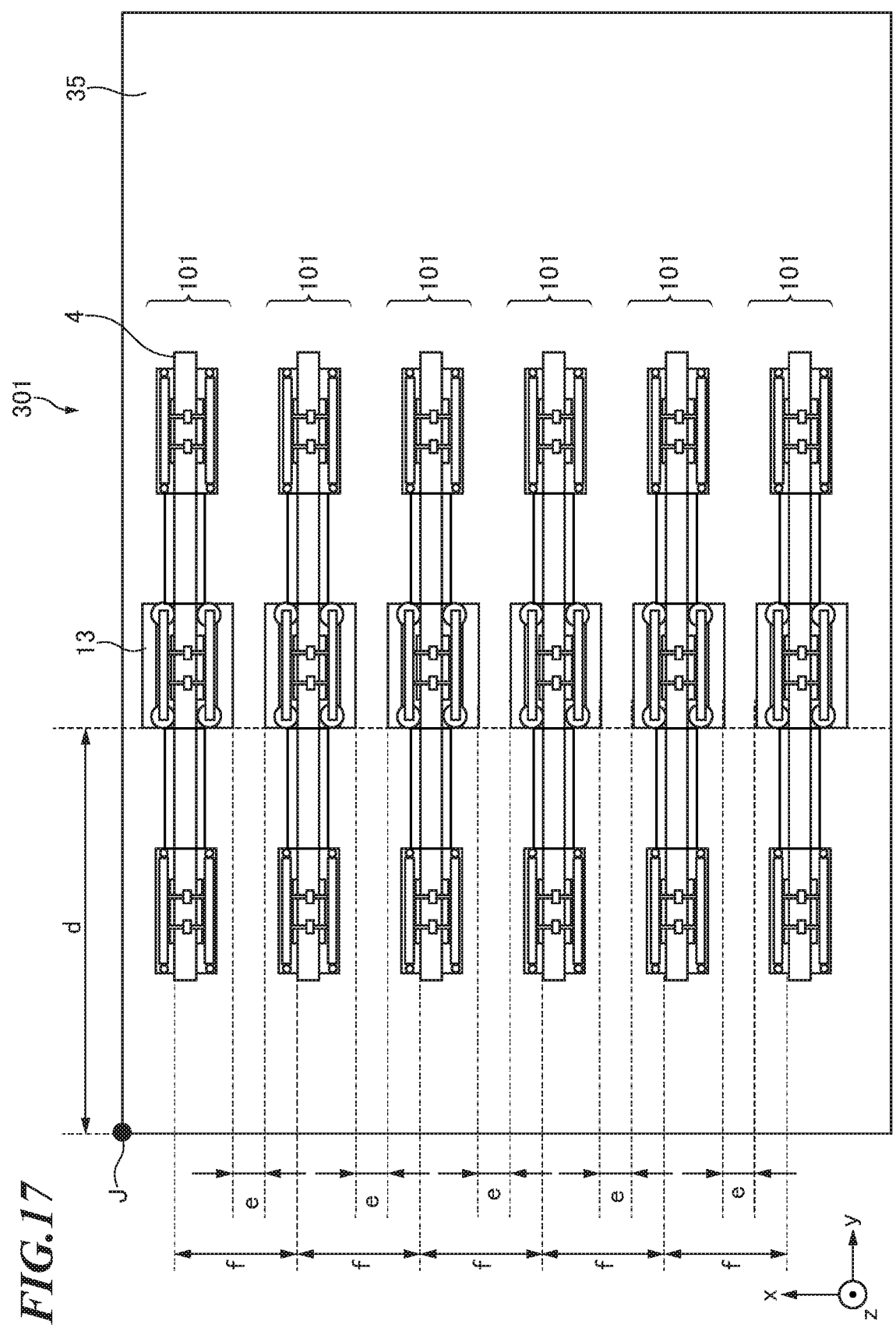
FIG. 17 is a view schematically showing a drive device concerning a third embodiment of the present invention.

FIG. 17 is a plan view schematically showing a drive device 301 concerning the third embodiment of the present invention. The drive device 301 has the six vibration actuators 101 and a main body 35. The main body 35 is equivalent to a configuration that the plurality of main bodies 15 corresponding to the plurality of vibration actuators 101 are integrally formed so as to extend in the x-y plane direction. Each vibration actuator 101 consists of three vibrator devices and is fixed to the main body 35 using the restraint member 13 of the central vibrator device as a reference position.

The central vibrator devices of the six vibration actuators 101 are aligned at positions that are displaced from a reference position J of the main body 35 by a distance d in the y-axis direction. Moreover, the six vibration actuators 101 are aligned so that a distance between any adjacent restraint members 13 becomes e and a distance between any adjacent contact members 4 becomes f (equalized). The drive device 301 shown in FIG. 17 can be used as the drive device for a multi-axis stage unit in FIG. 19 mentioned later, for example.

Figure 18A:
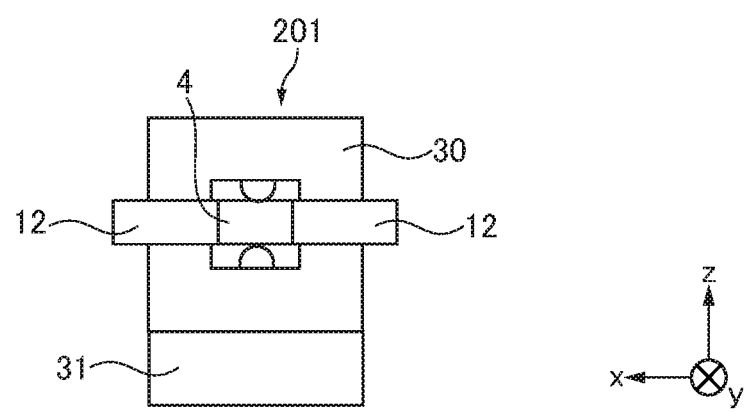
FIG. 18A and FIG. 18B are views schematically showing another drive device concerning the third embodiment of the present invention.
Figure 18B:
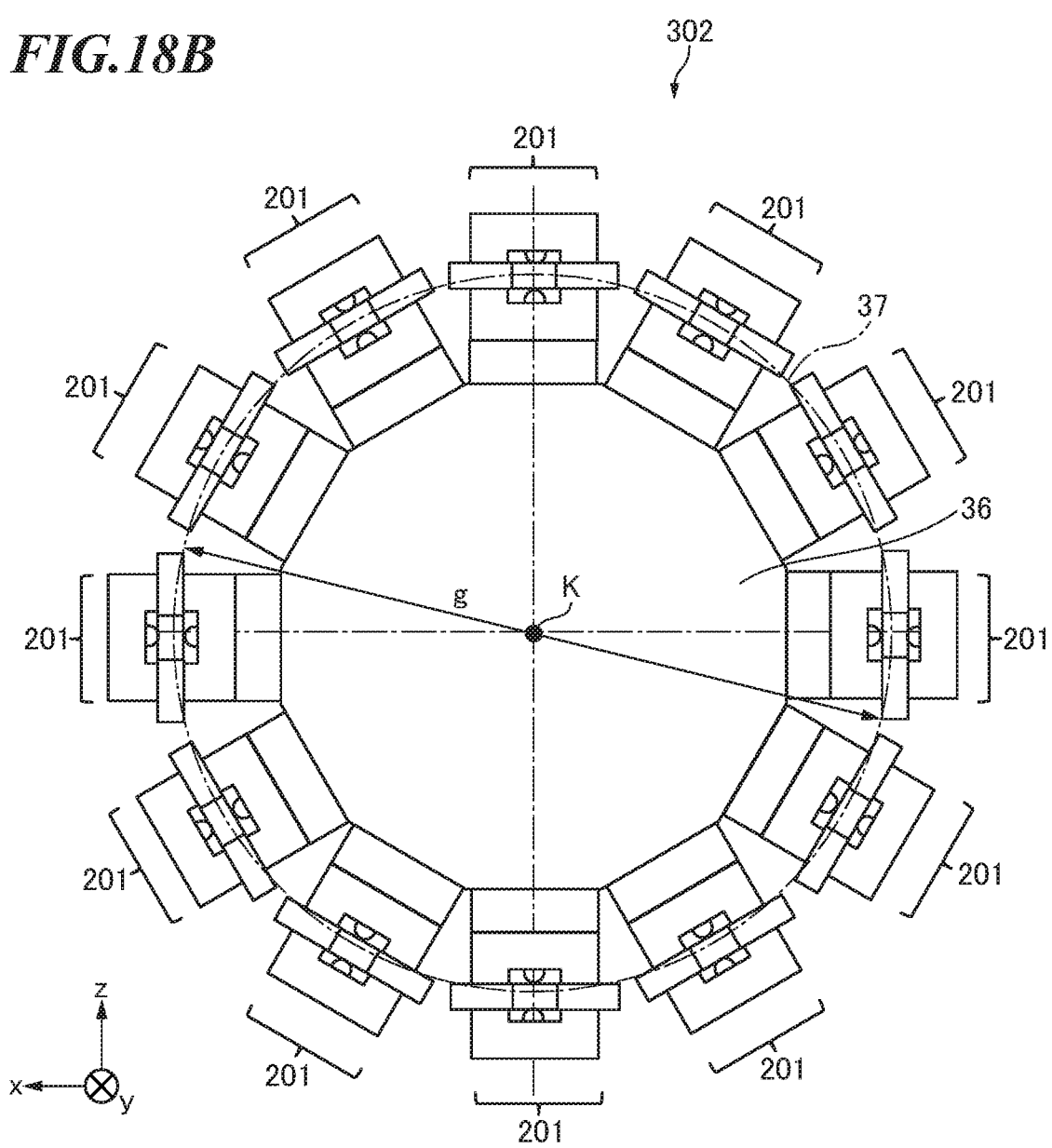

Another drive device 302 concerning the third embodiment of the present invention will be described by referring to FIG. 18A and FIG. 18B. FIG. 18A is a side view of the vibration actuator 201 and FIG. 18B is a side view of the drive device 302. The drive device 302 has the twelve vibration actuators 201 and a main body 36. The main body 36 is equivalent to a configuration that the plurality of main bodies 15 corresponding to the plurality of vibration actuators 201 are integrally formed. The section of the main body 36 parallel to the x-z plane is an approximately right dodecagon centered on a point K. Each of the vibration actuators 201 consists of three vibrator devices arranged in the y-axis direction like the vibrator actuator 101 in FIG. 17, and is fixed to the main body 36 using the restraint member 13 of the central vibrator device as a reference position. As shown in FIG. 18B, the twelve vibration actuators 201 are radially arranged so as to respectively correspond to the twelve sides of the right dodecagon section in the x-z plane.

According to the above configuration, the plurality of contact members 4 are arranged on a circumference of a pitch circle (reference circle) 37 of a diameter g centered on the point K with sufficient accuracy when viewing in the y-axis direction. Such a drive device 302 of FIG. 18B is usable as a drive device for an articulated robot shown in FIG. 21 mentioned later, for example.

In the above-mentioned configuration, although the plurality of vibration actuators 101 and 201 are positioned by the restraint members, any vibration actuators concerning the embodiments of the present invention can be positioned similarly. Moreover, although the plurality of vibration actuators 101 and 201 are arranged planarly or radially in the drive devices 301 and 302, a plurality of vibration actuators may be positioned and arranged in arbitrary positions. Moreover, the drive device of this embodiment includes a configuration that has one or more vibration actuators.

Next, a fourth embodiment of the present invention will be described. The fourth embodiment shows an application (a multi-axis stage unit) of the above-mentioned first, second, and third embodiments.

Figure 19:
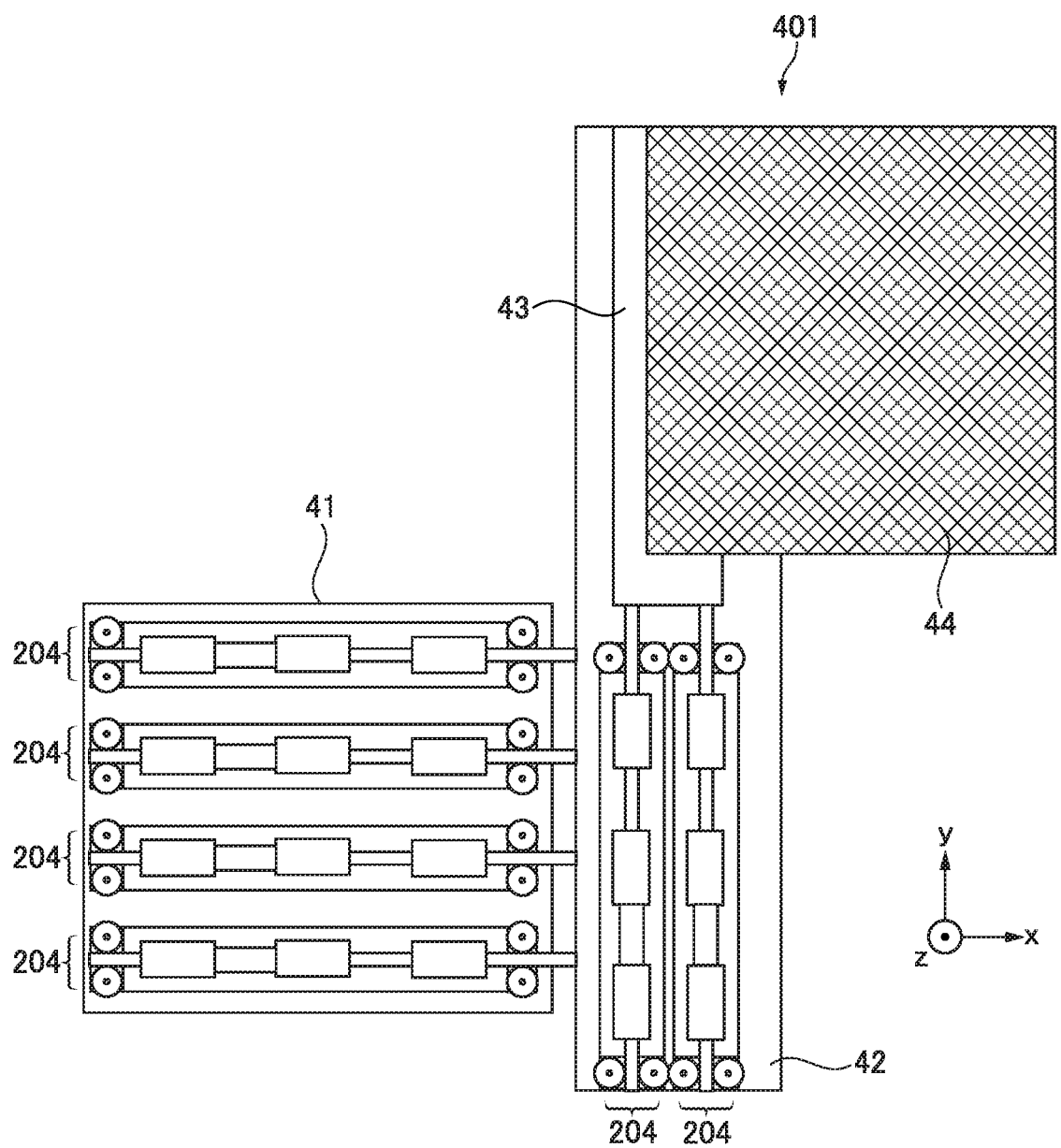
FIG. 19 is a plan view schematically showing a multi-axis stage concerning a fourth embodiment of the present invention.

FIG. 19 is a plan view schematically showing the multi-axis stage unit concerning the fourth embodiment of the present invention. The multi-axis stage unit 401 has a stationary part 41, an x-stage 42, a y-stage 43, and an xy-stage 44.

A degree of freedom of the stationary part 41 is restricted in all directions. The four vibration actuators 204 are arranged on the stationary part 41 side by side in the y-axis direction and are fixed by the same method as the third embodiment described by referring to FIG. 17. The contact members 4 of the vibration actuators 204 on the stationary part 41 are movable in the x-axis direction in FIG. 19 and right ends of the contact members 4 are fixed to the x-stage 42.

The x-stage 42 is movable only in the x-axis direction with respect to the stationary part 41 and its degree of freedom in the other directions is restricted. The two vibration actuators 204 are arranged on the x-stage 42 side by side in the x-axis direction and are fixed. The contact members 4 of the vibration actuators 204 on the x-stage 42 are movable in the y-axis direction in FIG. 19 and upper ends of the contact members 4 are fixed to the y-stage 43.

The y-stage 43 is movable only in the y-axis direction with respect to the x-stage 42 and its degree of freedom in the other directions is restricted. The xy-stage 44 is fixed to the y-stage 43. The xy-stage 44 is moved according to the movements of the x-stage 42 and the y-stage 43.

According to the above configuration, the multi-axis stage unit is achievable using the vibration actuators concerning the embodiments of the present invention mentioned above. Movable weight of the vibration actuators 204 on the stationary part 41 is larger than movable weight of the vibration actuators 204 on the x-stage 42. The number of the vibration actuators 204 for each axis can be changed suitably in accordance with weight that should be moved in each axis. Moreover, since the plurality of vibration actuators 204 are provided for each stage, a moment acting in a plane parallel to the x-y plane is reduced, which enables the movement of each stage with sufficient accuracy.

In the above-mentioned configuration, the multi-axis stage unit 401 having the xy-stage is achieved using the vibration actuators concerning the embodiments of the present invention. In the meantime, a stage unit having any degrees of freedom is achievable using the vibration actuators concerning the embodiments of the present invention.

The number of the vibration actuators for each axis is arbitrarily fluctuated in accordance with load in each axis. The multi-axis stage unit using the vibration actuators concerning the embodiments of the present invention is applicable to various stage devices, such as a microscope, a machine tool, and a measuring device.

Next, a fifth embodiment of the present invention will be described. The fifth embodiment shows another application (an articulated robot) of the above-mentioned first, second, and third embodiments.

Figure 20:
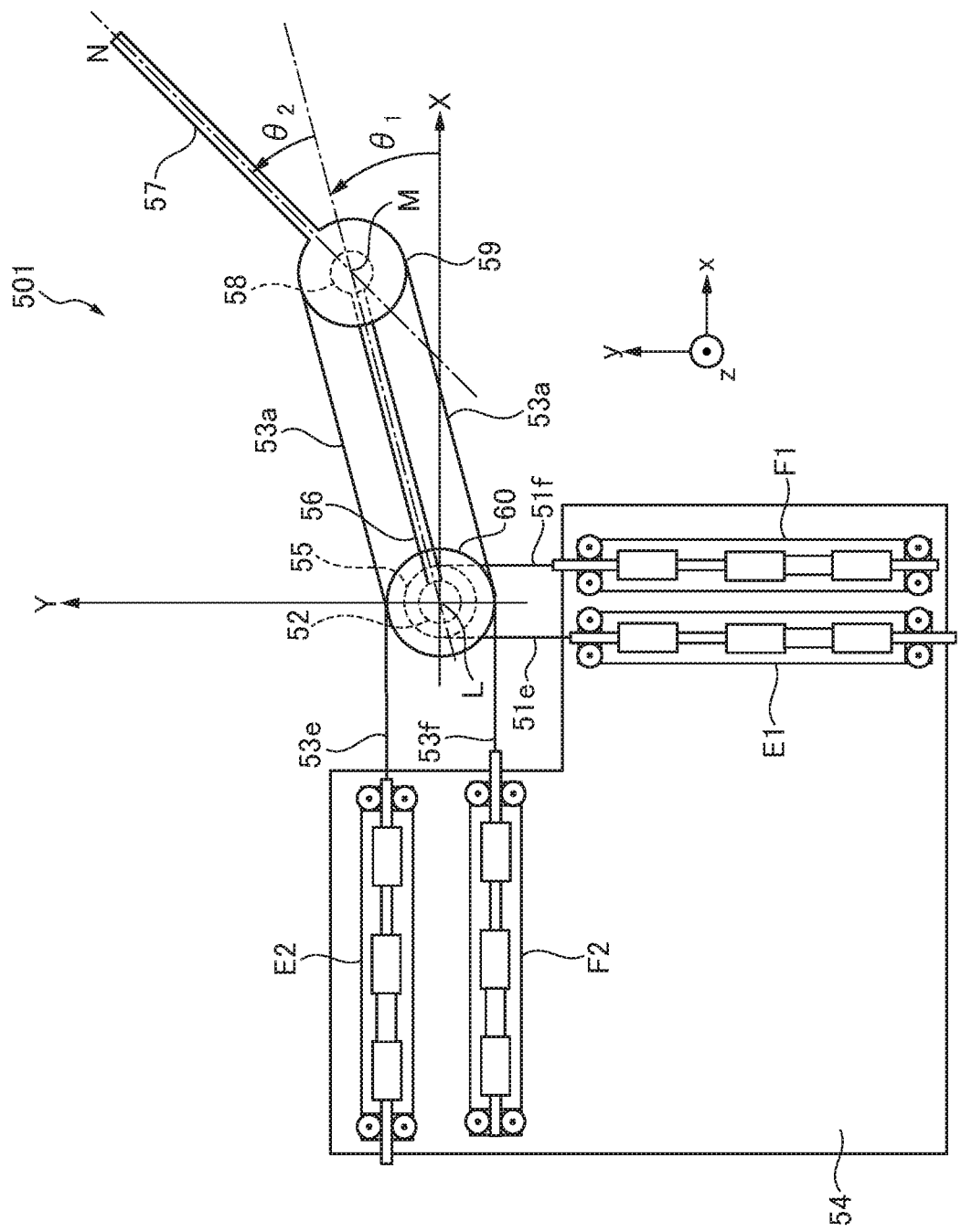
FIG. 20 is a plan view schematically showing an articulated robot concerning a fifth embodiment of the present invention.

FIG. 20 is a plan view schematically showing an articulated robot 501 concerning the fifth embodiment of the present invention. In the articulated robot 501 of this embodiment, a multiple joint arm is formed by connecting a plurality of movable parts rotatably by a plurality of joints. Specifically, the articulated robot 501 has a first joint 52, stationary part 54, first pulley 55, first link 56, second link 57, second joint 58, second pulley 59, and third pulley 60. Each of vibration actuators E1, F1, E2, and F2 provided in the stationary part 54 has the same configuration as the above-mentioned vibration actuator 204.

A framework of the articulated robot 501 including the links and pulleys will be described. The first joint 52 has a degree of freedom of rotation around an axis parallel to the z-axis at a point L. The second joint 58 has a degree of freedom of rotation around an axis parallel to the z-axis at a point M that moves with the movement of the first link 56.

The first pulley 55 shown by a hidden line is rotatable around the first joint 52. The first link 56 is fixed to the first pulley 55 and is rotatable around the first joint 52 together with the first pulley 55. The second pulley 59 is connected to the first link 56 through the second joint 58 and is rotatable around the second joint 58. The second link 57 is fixed to the second pulley 59 and is rotatable around the second joint 58 together with the second pulley 59. The third pulley 60 is rotatable around the first joint 52 independently from the first pulley 55.

A wire 51e is connected to the contact member 4 of the vibration actuator E1 and is wound around the first pulley 55, and a wire 51f of the other end is connected to the contact member 4 of the vibration actuator F1. Similarly, a wire 53e is connected to the contact member 4 of the vibration actuator E2 and is wound around the third pulley 60, and a wire 53f of the other end is connected to the contact member 4 of the vibration actuator F2. An endless wire 53a is wound around the second pulley 59 and the third pulley 60.

Driving methods for the vibration actuators will be described. The vibration actuators E1 and F1 having the contact members 4 extended in the y-axis direction respectively drive the wires 51e and 51f in the y-axis direction. When the vibration actuators E1 and F1 generate thrusts in the negative y-axis direction so that the wires 51e and 51f will not slacken, difference between the generated thrusts causes frictional force between the wires 51e and 51f and the first pulley 55, and the first link 56 is driven around the first joint 52. That is, the vibration actuators E1 and F1 drive the first link 56 around the first joint 52 within an X-Y plane of which origin is the point L, and cause a displacement of the first link 56 by an angle $\theta_1$ to the X-axis.

Similarly, the vibration actuators E2 and F2 having the contact members 4 extended in the x-axis direction respectively drive the wires 51e and 53f in the x-axis direction. When the vibration actuators E2 and F2 generate thrusts in the negative x-axis direction so that the wires 53e and 53f will not slacken, difference between the generated thrusts causes frictional force between the wires 53e and 53f and the third pulley 60. Since the above frictional force rotates the third pulley 60, the second pulley 59 interlocks through the endless wire 53a, which rotates the first link 56 and the second link 57 around the first joint 52 and the second joint 58, respectively. That is, the vibration actuators E2 and F2 cause a displacement of the first link 56 by an angle $\theta_1$ with respect to the x axis and a displacement of the second link 57 by an angle $\theta_2$ with respect to the first link 56.

Moreover, only the displacement of the second link 57 by the angle $\theta_2$ may be caused by driving the vibration actuators E1 and F1 so as to contradict the displacement of the first link 56 by an angle $\theta_1$ caused by driving the vibration actuators E2 and F2.

The above configuration enables the front end N of the second link 57 to move to a target position in the x-y plane by driving the vibration actuators. Since each pulley is antagonistically driven in a state where tension is always applied so that a wire will not slacken, backlash around a joint and deviation due to buckling of a wire can be reduced. As a result, torsional rigidity around each joint axis is improved and the front end N is positioned with high accuracy.

The configuration mentioned above by referring to FIG. 20 is an example of the articulated robot that employs the antagonistic drive system. The vibration actuators or the drive devices having the vibration actuators concerning the embodiments of the present invention are applicable to drive sources of a vertical articulated robot and a parallel link robot that have more degrees of freedom.

When the vibration actuators or the drive devices having the vibration actuators concerning the embodiments of the present invention are used as a drive source of an articulated robot system, a drive system is not limited to the antagonistic drive system. For example, as shown in FIG. 21, another articulated robot 502 that presses and pulls a wire with thrust in a range where buckling of a wire does not occur is constitutable.

Figure 21:
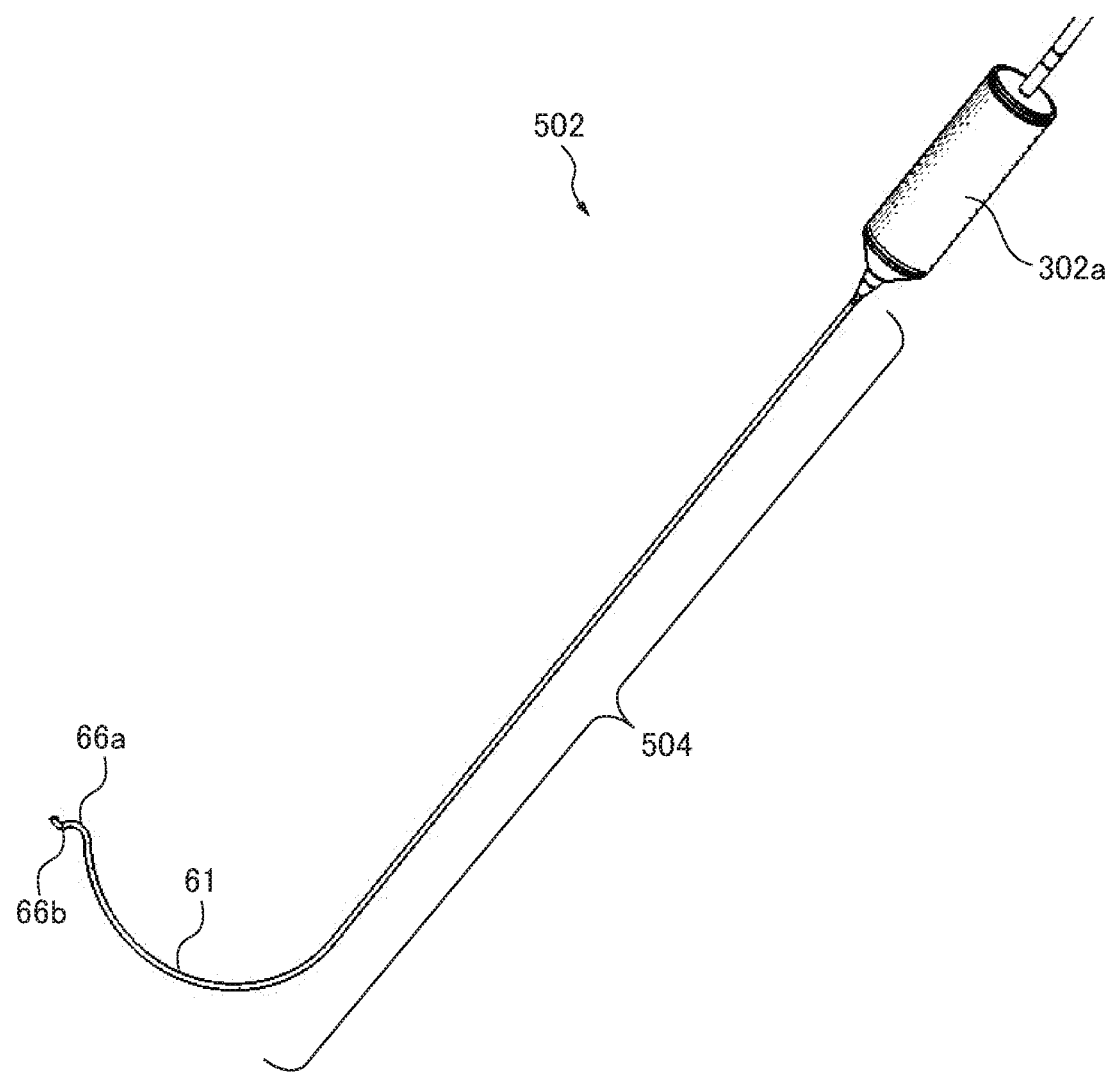
FIG. 21 is a perspective view schematically showing another articulated robot concerning the fifth embodiment of the present invention.

FIG. 21 is a perspective view schematically showing the articulated robot 502 concerning the fifth embodiment of the present invention. The articulated robot 502 employs a drive device 302a equivalent to the drive device 302 shown in FIG. 18B including the vibration actuators 201 as a driving source of a wire drive manipulator 504. The wire drive manipulator 504 provides a plurality of curve sections 66a and 66b at a front end part 61.

Figure 22:
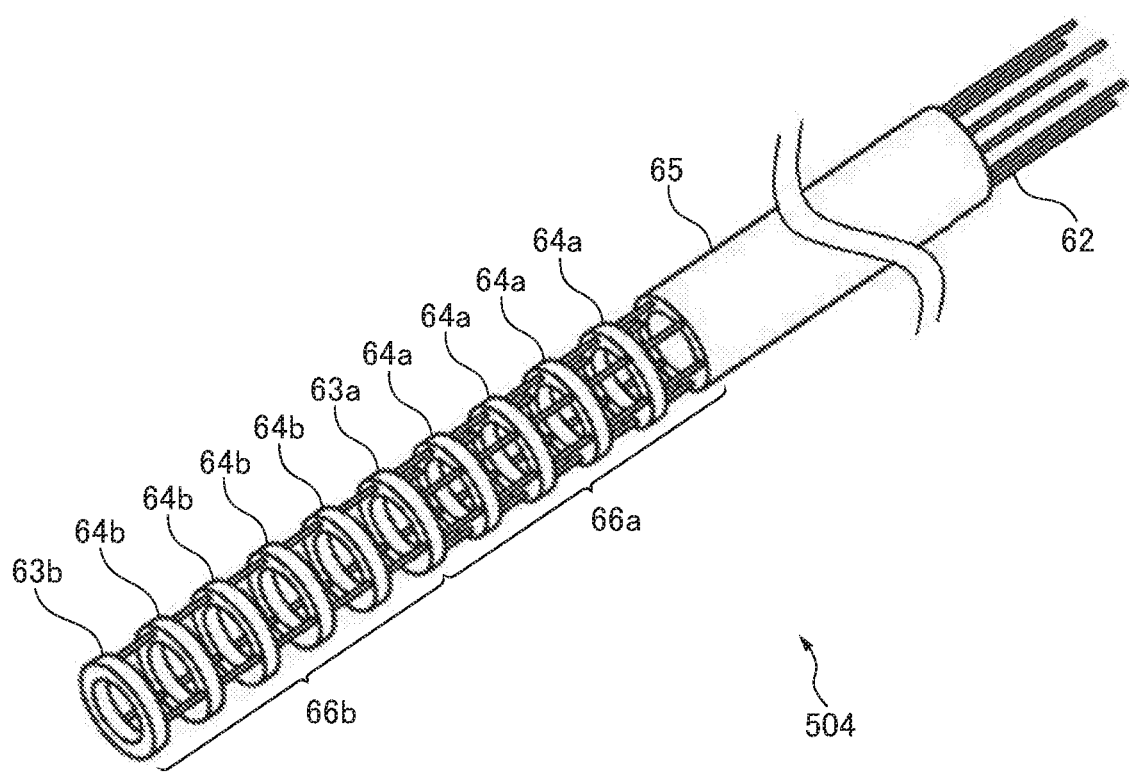
FIG. 22 is a perspective view schematically showing a wire drive manipulator that constitutes the articulated robot of FIG. 21.

FIG. 22 is a perspective view showing an internal configuration of the front end part 61 of the wire drive manipulator 504. Four ring-shaped guide members 64a and a ring-shaped tip member 63a are arranged in the curve section 66a. Moreover, four ring-shaped guide members 64b and a ring-shaped tip member 63b are arranged in the curve section 66b. Three wires are provided for each curve section. That is, six wires 62 in total are provided. One end of each of three wires 62 is fixed to the tip member 63a and one end of each of the other three wires 62 is fixed to the tip member 63b. The other ends of the wires 62 are connected to the contact members 4 of the vibration actuators 201. When the wires 62 are driven by the drive device 302a, the wires 62 slide in guide tubes provided in a wire guide part 65 without buckling, which changes curvatures of the curve sections 66a and 66b. It should be noted that the above-mentioned configuration of the curve sections is disclosed in Japanese Laid-Open Patent Publication (Kokai) No. 2018-140101 (JP 2018-140101A).

The drive device 302a is preferably packaged using the exterior member 86 as with the configuration described by referring to FIG. 16A through FIG. 16D. Packaging protects the internal parts appropriately and facilitates user's handling of the drive device 302a.

According to the above configuration, the wires that drive the wire drive manipulator are arranged with high accuracy by arranging the vibration actuators concerning the embodiments of the present invention to the drive device 302a using the restraint members as references. Accordingly, the curvatures of the curve sections 66a and 66b are controllable with high accuracy. Since the vibration actuators concerning the embodiments of the present invention are used as the driving source of the wire drive manipulator, the driving source is miniaturized as compared with a driving source that combines an electromagnetic motor and a deceleration mechanism. The number of the vibrator devices is fluctuated in response to the output demanded in each curve section. Furthermore, since components of the vibrator device are communized, the cost of changing the configuration for fluctuating an output is reduced. Since the weight of the contact member of the vibration actuator concerning the embodiments of the present invention is lighter than a conventional configuration, the response is improved as compared with the driving source that combines an electromagnetic motor and a deceleration mechanism.

Moreover, the velocity and the thrust of the wires that drive the curve sections 66a and 66b are freely controlled by changing the amplitude ratio between the two vibration modes shown in FIG. 2A and FIG. 2B. When voltage is not applied to the electro-mechanical energy conversion element, the posture of the curve sections 66a and 66b is kept by static friction force acting between the projecting parts and contact member. The frictional force acting between the projecting parts and contact member is changed by exciting vibration only in the vibration mode shown in FIG. 2B. As a result, when external force acts on the curve sections 66a and 66b, the curve sections 66a and 66b change the postures so as to stop actions of the external force. The above configuration is applicable to a safety mechanism used for avoiding a danger to a human body when the wire drive manipulator touches the human body. The above-mentioned articulated robot 502 is applicable to an industrial endoscope, a medical endoscope, and surgical instruments, such as a catheter used for medical practice, such as a medical care, a biopsy, and an inspection.

Although the 4-degrees-of-freedom articulated robot having the two curve sections is exemplified in the above-mentioned embodiment, the number of curve sections (i.e., degrees of freedom) is easily increased. Accordingly, an articulated robot that has more degrees of freedom is achievable. The shape of the main body 36, the diameter g of the pitch circle (reference circle) 37, the number and arrangement of the vibration actuators are suitably changed in accordance with the number of curve sections to drive and the diameter of the guide member.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-113755, filed Jun. 19, 2019, which is hereby incorporated by reference herein in its entirety.

What is claimed is:

1. A vibration actuator comprising:
vibrator devices that respectively have vibrators, each of which includes an elastic member and an electro-mechanical energy conversion element;
a contact member that contacts the vibrators and is movable in a predetermined direction relatively to the vibrators;
a restraint member that fixes a first vibrator device that is at least one of the vibrator devices to restrict a degree of freedom in the predetermined direction; and
a flexible member that has predetermined rigidity in the predetermined direction has rigidity, which is lower than the predetermined rigidity, in directions other than the predetermined direction, and connects a second vibrator device that is at least one of the vibrator devices to the first vibrator device.

2. The vibration actuator according to claim 1, wherein the vibrator devices are arranged in series in the predetermined direction.

3. The vibration actuator according to claim 1, wherein the contact member is moved relatively to the vibrators by thrust caused by vibration of each of the vibrators that occurs by applying alternating voltage to the electro-mechanical energy conversion element.

4. The vibration actuator according to claim 1, wherein the flexible member guides the contact member in a direction perpendicular to the predetermined direction according to movement of the second vibrator device.

5. The vibration actuator according to claim 4, wherein the flexible member has a rotation section that is rotatable around an axis parallel to the predetermined direction.

6. The vibration actuator according to claim 1, wherein each of the vibrator devices has a holding member that holds each of the vibrators, and
wherein at least one of the vibrator devices has a contact-member supporter that is provided in the holding member and guides the contact member in the predetermined direction by restricting a degree of freedom of the contact member.

7. The vibration actuator according to claim 6, wherein the first vibrator device fixed by the restraint member has the contact-member supporter.

8. The vibration actuator according to claim 6, wherein the contact-member supporter is provided in the holding member of each of two vibrator devices located at both ends in the predetermined direction among the vibrator devices.

9. The vibration actuator according to claim 6, wherein each of the vibrators functions as the contact-member supporter.

10. The vibration actuator according to claim 1, wherein a center axis of the flexible member is arranged on a same plane as a friction sliding surface of the contact member that the vibrators contact.

11. The vibration actuator according to claim 1, wherein each of the vibrator devices has two vibrators that are arranged so as to face each other across the contact member, and
wherein a center axis of the flexible member is located on a plane between two friction sliding surfaces of the contact member that the two vibrators contact.

12. The vibration actuator according to claim 1, wherein each of the vibrator devices has a pressurizing member that presses each of the vibrators against the contact member and a reaction force receiving member that receives a reaction force against a pressure force applied by the pressurizing member.

13. The vibration actuator according to claim 12, wherein the reaction force receiving member is a roller that contacts the contact member and is rotatable around a center axis perpendicular to the predetermined direction.

14. The vibration actuator according to claim 12, wherein the elastic member has a projecting part that contacts the contact member, and wherein vibration causing displacement in a direction parallel to a surface in contact with the contact member is excited at a front end of the projecting part in a case where alternating voltage is applied to the electromechanical energy conversion element.

15. The vibration actuator according to claim 14, wherein the projecting part functions as the reaction force receiving member.

16. A drive device comprising:

one or more vibration actuators each of which comprising:

vibrator devices that respectively have vibrators, each of which includes an elastic member and an electromechanical energy conversion element;

a contact member that contacts the vibrators and is movable in a predetermined direction relatively to the vibrators to drive a target;

a restraint member that fixes a first vibrator device that is at least one of the vibrator devices to restrict a degree of freedom in the predetermined direction; and a flexible member that has predetermined rigidity in the predetermined direction has rigidity, which is lower than the predetermined rigidity, in directions other than the predetermined direction, and connects a second vibrator device that is at least one of the vibrator devices to the first vibrator device; and a main body to which the one or more vibration actuators are fixed by the restraint member.

17. The drive device according to claim 16, wherein the main body has a contact-member supporter that guides the contact member in the predetermined direction by restricting a degree of freedom of the contact member.

18. The drive device according to claim 16, wherein the vibration actuators are arranged on a circumference of a reference circle of a predetermined diameter when viewed from the predetermined direction.

19. A multi-axis stage unit comprising:

a stationary part;

a stage that is movable with respect to the stationary part; and at least one vibration actuator that is provided in the stationary part and drives the stage, the vibration actuator comprising:

vibrator devices that respectively have vibrators, each of which includes an elastic member and an electromechanical energy conversion element;

a contact member that contacts the vibrators and is movable in a predetermined direction relatively to the vibrators to drive the stage;

a restraint member that fixes a first vibrator device that is at least one of the vibrator devices to restrict a degree of freedom in the predetermined direction; and a flexible member that has predetermined rigidity in the predetermined direction has rigidity, which is lower than the predetermined rigidity, in directions other than the predetermined direction, and connects a second vibrator device that is at least one of the vibrator devices to the first vibrator device.

20. An articulated robot comprising:

joints;

movable parts that are connected by the joints; and vibration actuators that drive the movable parts, each of the vibration actuators comprising:

vibrator devices that respectively have vibrators, each of which includes an elastic member and an electromechanical energy conversion element;

a contact member that contacts the vibrators and is movable in a predetermined direction relatively to the vibrators to drive the movable parts;

a restraint member that fixes a first vibrator device that is at least one of the vibrator devices to restrict a degree of freedom in the predetermined direction; and a flexible member that has predetermined rigidity in the predetermined direction has rigidity, which is lower than the predetermined rigidity, in directions other than the predetermined direction, and connects a second vibrator device that is at least one of the vibrator devices to the first vibrator device.

* * * * *